US011916713B2

(12) United States Patent
Sakhnini et al.

(10) Patent No.: US 11,916,713 B2
(45) Date of Patent: Feb. 27, 2024

(54) MULTI-MODE REFERENCE SIGNAL BASED INFORMATION USING INDEX MODULATION

(71) Applicant: QUALCOMM Incorporated, San Diego, CA (US)

(72) Inventors: Iyab Issam Sakhnini, San Diego, CA (US); Peter Gaal, San Diego, CA (US); Tao Luo, San Diego, CA (US); Mahmoud Taherzadeh Boroujeni, San Diego, CA (US); Junyi Li, Chester, NJ (US); Wanshi Chen, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 127 days.

(21) Appl. No.: 17/112,155

(22) Filed: Dec. 4, 2020

(65) Prior Publication Data

US 2022/0182272 A1 Jun. 9, 2022

(51) Int. Cl.
*H04L 27/26* (2006.01)
*H04L 5/00* (2006.01)

(52) U.S. Cl.
CPC ........ *H04L 27/2613* (2013.01); *H04L 5/0023* (2013.01); *H04L 5/0035* (2013.01); *H04L 5/0051* (2013.01)

(58) Field of Classification Search
USPC ....................................................... 370/329
See application file for complete search history.

(56) References Cited

U.S. PATENT DOCUMENTS

| 11,038,648 | B1* | 6/2021 | Khayrallah | H04B 7/0691 |
| 11,343,043 | B2* | 5/2022 | Kwak | H04L 27/261 |
| 2019/0181928 | A1* | 6/2019 | Pan | H04B 7/02 |

FOREIGN PATENT DOCUMENTS

| CN | 108900291 A | * 11/2018 | ......... H04L 27/2601 |
| CN | 108900291 B | 10/2020 | |

(Continued)

OTHER PUBLICATIONS

Cai et al. Multi-Carrier M-ary DCSK System With Code Index Modulation: An Efficient Solution for Chaotic Communications; (Year: 2019).*

(Continued)

*Primary Examiner* — Jeffrey M Rutkowski
*Assistant Examiner* — Luna Weissberger
(74) *Attorney, Agent, or Firm* — Holland & Hart LLP

(57) ABSTRACT

Methods, systems, and devices for wireless communication are described. A communication device, such as, a base station and a UE may support transmitting and receiving information bits according to one or more index modulation schemes. For example, the communication device may support conveying information bits using a reference signal index modulation scheme, which uses reference signals transmissions using particular resources or reference signal sequences, or both, to convey the information bits. The communication device may improve reference signal resource usage by supporting a multi-mode reference signal index modulation scheme, which utilizes all reference signal resources to convey the information bits. By using the multi-mode reference signal index modulation scheme, the communication device may, as a result, include features for improvements to conveying information bits, among other benefits.

30 Claims, 14 Drawing Sheets

(56) References Cited

FOREIGN PATENT DOCUMENTS

KR  WO-2022080530 A1 * 4/2022
WO  WO-2022080530 A1 * 4/2022

OTHER PUBLICATIONS

Kaddoum et al. On the Comparison Between Code-Index Modulation and Spatial Modulation Techniques (Year: 2015).*
Multi-Carrier M-ary DCSK System With Code Index Modulation: An Efficient Solution for Chaotic Communications, IEEE (Year: 2019).*
Pilot Insertion with Index Modulation for OFDM-Based Vehicular Communications, IEEE (Year: 2018).*
On the Performance of OFDM Index Modulation over Nakagami Fading Channels, IEEE (Year: 2017).*
Cheng X., et al., "Index Modulation for SG: Striving to Do More with Less", arxiv.org, Cornell University Library, 201 OLIN Library Cornell University Ithaca, NY 14853, Dec. 18, 2017 (Dec. 18, 2017), XP080846893, 20 Pages, Section VI.
International Search Report and Written Opinion—PCT/US2021/052596—ISA/EPO—dated Jan. 14, 2022 (2100592WO).
Qiang L., et al., "Pilot Insertion with Index Modulation for OFDM-Based Vehicular Communications", 2018 IEEE Global Conference on Signal and Information Processing (Globals IP), IEEE, Nov. 26, 2018 (Nov. 26, 2018), pp. 1204-1208, XP033520644, DOI: 10.1109/GLOBALSIP.2018.8646384, [Retrieved on Feb. 20, 2019], Sections II, III figure 1 last paragraph, p. 1204.

* cited by examiner

FIG. 5

MULTI-MODE REFERENCE SIGNAL BASED INFORMATION USING INDEX MODULATION

FIELD OF TECHNOLOGY

The following relates to wireless communication, including multi-mode reference signal based information using index modulation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In these systems, the UEs may be configured to support wireless communication of information bits using various index modulation schemes. When using index modulation schemes, the UEs may use resources for embedding information bits into a signal. The resources may be physical resources (e.g., antenna, subcarrier, time slot, and frequency carrier) or virtual resources (e.g., virtual parallel channels, signal constellation, space-time matrix, and antenna activation orders). In some cases, some of the resources (e.g., subcarriers, antennas, time slots or channel states) may be used for the wireless communication of the information bits, while some of the other resources are unused. It therefore may be desirable to improve resource usage related to wireless communication of information bits, among other aspects.

SUMMARY

Various aspects of the present disclosure relate to configuring a communication device, for example, a base station (e.g., a NodeB, an eNodeB (eNB), a next-generation NodeB (gNB) and a UE to support transmitting and receiving information bits according to one or more index modulation schemes. For example, the communication device may support conveying information bits using a reference signal index modulation scheme, which uses reference signals transmissions using particular resources or reference signal sequences, or both, to convey the information bits. The communication device may improve reference signal resource usage by supporting a multi-mode reference signal index modulation scheme, which utilizes all reference signal resources to convey the information bits. By using the multi-mode reference signal index modulation scheme, the communication device may, as a result, include features for improvements to conveying information bits and, in some examples, may promote enhanced efficiency for higher reliability and lower latency wireless communications in 5G systems, among other benefits.

A method for wireless communication at a first device is described. The method may include determining a set of reference signal resources to convey a set of information bits to a second device via one or more reference signals, the set of information bits including a first subset of information bits and a second subset of information bits, selecting a first index modulation scheme or a second index modulation scheme for encoding the set of reference signal resources to include the second subset of information bits based on values of the first subset of information bits, encoding a set of reference signals to include the set of information bits using the first index modulation scheme for a first value of the first subset of information bits and the second index modulation scheme for a second value of the first subset of information bits, and transmitting, to the second device, the set of reference signals that are encoded to include the set of information bits.

An apparatus for wireless communication at a first device is described. The apparatus may include a processor, memory in electronic communication with the processor, and instructions stored in the memory. The instructions may be executable by the processor to cause the apparatus to determine a set of reference signal resources to convey a set of information bits to a second device via one or more reference signals, the set of information bits including a first subset of information bits and a second subset of information bits, select a first index modulation scheme or a second index modulation scheme for encoding the set of reference signal resources to include the second subset of information bits based on values of the first subset of information bits, encode a set of reference signals to include the set of information bits using the first index modulation scheme for a first value of the first subset of information bits and the second index modulation scheme for a second value of the first subset of information bits, and transmit, to the second device, the set of reference signals that are encoded to include the set of information bits.

Another apparatus for wireless communication at a first device is described. The apparatus may include means for determining a set of reference signal resources to convey a set of information bits to a second device via one or more reference signals, the set of information bits including a first subset of information bits and a second subset of information bits, means for selecting a first index modulation scheme or a second index modulation scheme for encoding the set of reference signal resources to include the second subset of information bits based on values of the first subset of information bits, means for encoding a set of reference signals to include the set of information bits using the first index modulation scheme for a first value of the first subset of information bits and the second index modulation scheme for a second value of the first subset of information bits, and means for transmitting, to the second device, the set of reference signals that are encoded to include the set of information bits.

A non-transitory computer-readable medium storing code for wireless communication at a first device is described. The code may include instructions executable by a processor to determine a set of reference signal resources to convey a set of information bits to a second device via one or more reference signals, the set of information bits including a first subset of information bits and a second subset of information bits, select a first index modulation scheme or a second index modulation scheme for encoding the set of reference signal resources to include the second subset of information bits based on values of the first subset of information bits, encode a set of reference signals to include the set of information bits using the first index modulation scheme for a first value of the first subset of information bits and the second index modulation scheme for a second value of the first subset of information bits, and transmit, to the second device, the set of reference signals that are encoded to include the set of information bits.

In some examples of the method, apparatuses, and non-transitory computer-readable medium described herein, encoding the set of reference signals may include operations, features, means, or instructions for encoding the set of reference signals to include the first subset of information bits using a spatial index modulation scheme including mapping the first subset of information bits to one or more directional beams, where transmitting the set of reference signals may be based on the spatial index modulation scheme.

In some examples of the method, apparatuses, and non-transitory computer-readable medium described herein, encoding the set of reference signals may include operations, features, means, or instructions for encoding the set of reference signals to include the first subset of information bits based on a frequency domain index modulation scheme including mapping the first subset of information bits to one or more subcarriers in a frequency domain, where transmitting the set of reference signals may be based on the frequency domain index modulation scheme.

In some examples of the method, apparatuses, and non-transitory computer-readable medium described herein, encoding the set of reference signals may include operations, features, means, or instructions for encoding the set of reference signals to include the first subset of information bits based on a time domain index modulation scheme including mapping the first subset of information bits to one or more symbol periods in a time domain, where transmitting the encoded set of reference signals may be based on the time domain index modulation scheme.

In some examples of the method, apparatuses, and non-transitory computer-readable medium described herein, encoding the set of reference signals may include operations, features, means, or instructions for encoding the set of reference signals to include the second subset of information bits based on mapping the second subset of information bits to one or more reference signal sequences, where transmitting the encoded set of reference signals may be based on the one or more reference signal sequences.

In some examples of the method, apparatuses, and non-transitory computer-readable medium described herein, the first index modulation scheme includes a first subset of reference signal sequences that map to values of the second subset of information bits and the second index modulation scheme includes a second subset of reference signal sequences that map to the values of the second subset of information bits.

In some examples of the method, apparatuses, and non-transitory computer-readable medium described herein, encoding the set of reference signals may include operations, features, means, or instructions for encoding the set of reference signals to include the second subset of information bits based on mapping the second subset of information bits to one or more reference signal ports, where transmitting the encoded set of reference signals may be based on the one or more reference signal ports.

In some examples of the method, apparatuses, and non-transitory computer-readable medium described herein, encoding the set of reference signals may include operations, features, means, or instructions for encoding the set of reference signals to include the second subset of information bits based on a reference signal density in one or both of a time domain and a frequency domain, where transmitting the encoded set of reference signals may be based on the reference signal density.

In some examples of the method, apparatuses, and non-transitory computer-readable medium described herein, encoding the set of reference signals may include operations, features, means, or instructions for encoding the set of reference signals to include the second subset of information bits based on an allocation of reference signal resources in one or more both of a time domain and a frequency domain in a reference signal resource block, where transmitting the encoded set of reference signals may be based on the allocation of reference signal resources in one or more both of the time domain and the frequency domain in the reference signal resource block.

In some examples of the method, apparatuses, and non-transitory computer-readable medium described herein, encoding the set of reference signals may include operations, features, means, or instructions for encoding the set of reference signals to include the second subset of information bits based on an allocation of reference signal resources in one or more both of a time domain and a frequency domain in bandwidth part, where transmitting the encoded set of reference signals may be based on the allocation of reference signal resources in one or more both of the time domain and the frequency domain in the bandwidth part.

In some examples of the method, apparatuses, and non-transitory computer-readable medium described herein, one or more reference signal resources of the set of reference signal resources may be orthogonal in a time domain.

In some examples of the method, apparatuses, and non-transitory computer-readable medium described herein, one or more reference signal resources of the set of reference signal resources may be orthogonal in a frequency domain.

In some examples of the method, apparatuses, and non-transitory computer-readable medium described herein, one or more reference signal resources of the set of reference signal resources may be orthogonal in a spatial domain.

In some examples of the method, apparatuses, and non-transitory computer-readable medium described herein, the first device includes a UE, the second device includes a base station, and a reference signal of the set of reference signals includes a sounding reference signal (SRS), a physical random access channel (PRACH), or a demodulation reference signal (DMRS), or any combination thereof.

In some examples of the method, apparatuses, and non-transitory computer-readable medium described herein, the first device includes a base station, the second device includes a UE, and a reference signal of the set of reference signals includes channel state information reference signal CSI-RS or a DMRS, or a combination thereof.

In some examples of the method, apparatuses, and non-transitory computer-readable medium described herein, the first device includes a first UE, the second device includes a second UE, and a reference signal of the set of reference signals includes a SL-RS.

A method for wireless communication at a first device is described. The method may include receiving, from a second device, a reference signal, identifying a sequence associated with the reference signal, and decoding the reference signal to determine a first subset of information bits of a set of information bits encoded in the reference signal and a second subset of information bits of the set of information bits encoded in the reference signal based on identifying the sequence, the first subset of information bits encoded in the reference signal based on the sequence corresponding to a first group of sequences or a second group of sequences and the second subset of information bits encoded in the reference signal based on a mapping between the sequence and one or more values of the second subset of information bits.

An apparatus for wireless communication at a first device is described. The apparatus may include a processor, memory in electronic communication with the processor, and instructions stored in the memory. The instructions may be executable by the processor to cause the apparatus to receive, from a second device, a reference signal, identify a sequence associated with the reference signal, and decode the reference signal to determine a first subset of information bits of a set of information bits encoded in the reference signal and a second subset of information bits of the set of information bits encoded in the reference signal based on identifying the sequence, the first subset of information bits encoded in the reference signal based on the sequence corresponding to a first group of sequences or a second group of sequences and the second subset of information bits encoded in the reference signal based on a mapping between the sequence and one or more values of the second subset of information bits.

Another apparatus for wireless communication at a first device is described. The apparatus may include means for receiving, from a second device, a reference signal, means for identifying a sequence associated with the reference signal, and means for decoding the reference signal to determine a first subset of information bits of a set of information bits encoded in the reference signal and a second subset of information bits of the set of information bits encoded in the reference signal based on identifying the sequence, the first subset of information bits encoded in the reference signal based on the sequence corresponding to a first group of sequences or a second group of sequences and the second subset of information bits encoded in the reference signal based on a mapping between the sequence and one or more values of the second subset of information bits.

A non-transitory computer-readable medium storing code for wireless communication at a first device is described. The code may include instructions executable by a processor to receive, from a second device, a reference signal, identify a sequence associated with the reference signal, and decode the reference signal to determine a first subset of information bits of a set of information bits encoded in the reference signal and a second subset of information bits of the set of information bits encoded in the reference signal based on identifying the sequence, the first subset of information bits encoded in the reference signal based on the sequence corresponding to a first group of sequences or a second group of sequences and the second subset of information bits encoded in the reference signal based on a mapping between the sequence and one or more values of the second subset of information bits.

In some examples of the method, apparatuses, and non-transitory computer-readable medium described herein, decoding the reference signal may include operations, features, means, or instructions for decoding the reference signal to determine the first subset of information bits based on a spatial index demodulation including mapping the first subset of information bits to one or more directional beams.

In some examples of the method, apparatuses, and non-transitory computer-readable medium described herein, decoding the reference signal may include operations, features, means, or instructions for decoding the reference signal to determine the first subset of information bits based on a frequency domain index demodulation including mapping the first subset of information bits to one or more symbol periods in a frequency domain.

In some examples of the method, apparatuses, and non-transitory computer-readable medium described herein, decoding the reference signal may include operations, features, means, or instructions for decoding the reference signal to determine the first subset of information bits based on a time domain index demodulation including mapping the first subset of information bits to one or more symbol periods in a time domain.

In some examples of the method, apparatuses, and non-transitory computer-readable medium described herein, decoding the reference signal may include operations, features, means, or instructions for decoding the reference signal to determine the second subset of information bits based on mapping the second subset of information bits to one or more reference signal sequences.

In some examples of the method, apparatuses, and non-transitory computer-readable medium described herein, decoding the reference signal may include operations, features, means, or instructions for decoding the reference signal to determine the second subset of information bits based on mapping the second subset of information bits to one or more reference signal ports.

In some examples of the method, apparatuses, and non-transitory computer-readable medium described herein, decoding the reference signal may include operations, features, means, or instructions for decoding the reference signal to determine the second subset of information bits based on a reference signal density in one or both of a time domain and a frequency domain.

In some examples of the method, apparatuses, and non-transitory computer-readable medium described herein, decoding the reference signal may include operations, features, means, or instructions for decoding the reference signal to determine the second subset of information bits based on an allocation of reference signal resources in one or more both of a time domain and a frequency domain in a reference signal resource block.

In some examples of the method, apparatuses, and non-transitory computer-readable medium described herein, decoding the reference signal may include operations, features, means, or instructions for decoding the reference signal to determine the second subset of information bits based on an allocation of reference signal resources in one or more both of a time domain and a frequency domain in bandwidth part.

In some examples of the method, apparatuses, and non-transitory computer-readable medium described herein, the first device includes a base station, the second device includes a UE, and the reference signal includes a SRS, a PRACH, or a DMRS, or any combination thereof.

In some examples of the method, apparatuses, and non-transitory computer-readable medium described herein, the first device includes a UE, the second device includes a base station, and the reference signal includes a CSI-RS or a DMRS, or a combination thereof.

In some examples of the method, apparatuses, and non-transitory computer-readable medium described herein, the first device includes a second UE, the second device includes a first UE, and the reference signal includes a SL-RS.

BRIEF DESCRIPTION OF THE DRAWINGS

FIGS. 3 through 6 illustrate examples of modulation schemes that support multi-mode reference signal based information using index modulation in accordance with aspects of the present disclosure.

DETAILED DESCRIPTION

Figure 1:
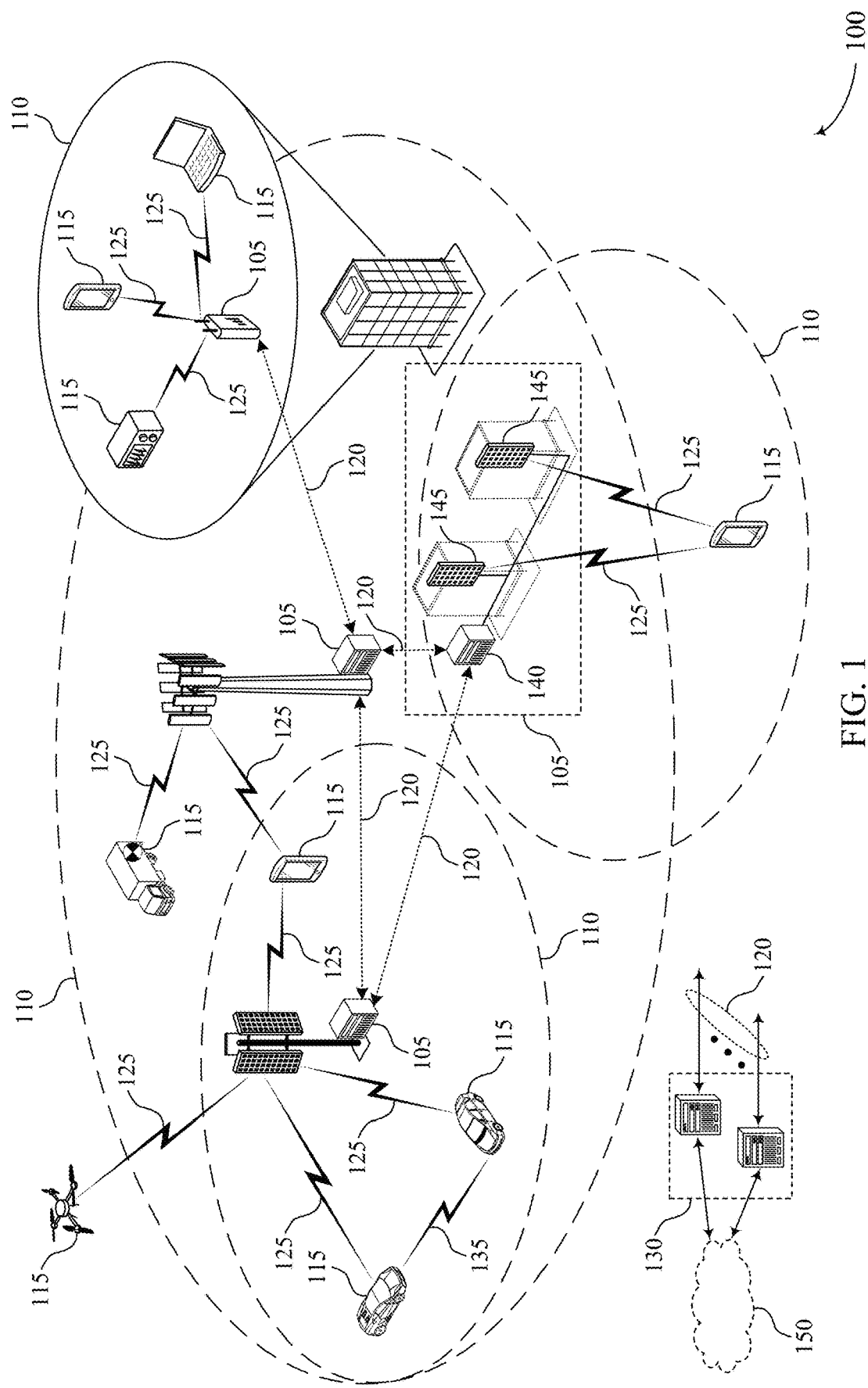
FIGS. 1 and 2 illustrate examples of wireless communications systems that support multi-mode reference signal based information using index modulation in accordance with aspects of the present disclosure.

Various aspects of the present disclosure relate to configuring a communication device, such as a UE and a base station, for example, an eNB, a gNB in a wireless communication system to support wireless communication of multi-mode reference signal based information using index modulation. A communication device may transmit reference signal transmissions (e.g., sounding reference signals (SRS), channel state information reference signals (CSI-RS), demodulation reference signals (DMRS), physical random access channel (PRACH), sidelink reference signals (SL-RS), etc.) using reference signal index modulation, in which a set of information bits are segmented into at least two subset of information bits. The first subset can be conveyed implicitly via activation of subcarriers using frequency domain index modulation, activation of antennas via spatial domain index modulation, or activation of symbol periods in a time domain, or a combination thereof. In contrast, the second subset can be modulated using amplitude and phase modulation schemes, among other examples. As a result, a subset of reference signal resources, for example, subcarriers, antennas, time slots or channel states, are used for the reference signal transmissions. Thus, the other reference signals resources are unused. These reference signal transmissions may have to be made reliable enough to meet reliability targets. However, some index modulation schemes may not provide sufficient reliability.

Various aspects of the present disclosure relate to configuring the communication device to support a multi-mode reference signal index modulation scheme, in which some or all reference signal resources are utilized to convey information bits to another communication device. For example, the communication device may be configured to use L reference signal resources and each of the reference signal resources may have an orthogonal property S. The references signal resources L may be divided into G groups with each group having the orthogonal property. Each group may thereby support $\log_2 S$ bits. The G groups may also carry the second subset of information bits, and can be conveyed (e.g., encoded) based on reference signal sequences, reference signal ports, reference signal densities, time and frequency resource allocation, etc. Because there are G possible groups, each reference signal resource can also carry $\lceil \log_2 (G) \rceil$ bits for the first subset of information bits. These information bits can be conveyed (e.g., encoded) by the communication device using spatial index modulation (e.g., activation of certain beams), frequency domain index modulation (e.g., activation of certain subcarriers), or time domain index modulation (e.g., activation of certain OFDM symbols), or any combination thereof. The communication device may, as a result, provide reference signal transmissions that are more reliable to meet reliability targets.

For example, a communication device (e.g., a transmitting device), such as a base station or a UE, may determine a set of reference signal resources (e.g., CSI-RS resources, DMRS resources, PRACH resources, SRS resources, SL-RS resources) to convey a set of information bits to another communication device (e.g., a base station, a UE) via one or more reference signals (e.g., CSI-RS, DMRS, PRACH, SRS, SL-RS). As described herein, the set of information bits may include a first subset of information bits and a second subset of information bits. The communication device may be configured to select a first index modulation scheme or a second index modulation scheme for encoding the set of reference signal resources to include the second subset of information bits based on values of the first subset of information bits. The communication device may be configured to encode a set of reference signals to include the set of information bits using the first index modulation scheme for a first value of the first subset of information bits and the second index modulation scheme for a second value of the first subset of information bits. The communication device may be configured to transmit, to the other communication device, the set of reference signals that are encoded to include the set of information bits.

Additionally or alternatively, the other communication device (e.g., a receiving device), such as a base station or a UE, may be configured to receive the reference signals (e.g., CSI-RS, DMRS, PRACH, SRS, SL-RS) and identify a sequence associated with the reference signals. The communication device may be configured to decode the reference signals to determine the first subset of information bits encoded in the reference signals and the second subset of information bits encoded in the reference signal based on identifying the sequence. For example, the first subset of information bits may be encoded in the reference signal based on the sequence corresponding to a first group of sequences or a second group of sequences and the second subset of information bits encoded in the reference signal based on a mapping between the sequence and one or more values of the second subset of information bits.

Aspects of the present disclosure may be implemented to realize one or more of the following potential improvements, among others. The present disclosure may provide benefits and enhancements to the operation of the communication device. For example, operations performed by the communication device may provide improvements to resource usage for multi-mode reference signal index modulation. In some examples, by configuring the communication device to efficiently use reference signal resources, the communication device may lower latency for conveying information bits using multi-mode reference signal index modulation. In some other examples, configuring the communication device to support multi-mode reference signal index modulation may support improvements to power saving for the communication device. For example, the communication device may increase its battery life by providing efficient wireless communication (e.g., conveying information bits), as a result of utilizing all reference signal resources for multi-mode reference signal index modulation.

Aspects of the disclosure are initially described in the context of wireless communications systems. Aspects of the disclosure are further illustrated by and described with reference to apparatus diagrams, system diagrams, and flowcharts that relate to multi-mode reference signal based information using index modulation.

FIG. 1 illustrates an example of a wireless communications system 100 that supports multi-mode reference signal based information using index modulation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

A carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology). The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). The wireless communications system 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

A base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. The multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may reduce a bandwidth utilization. For example, a base station 105 may reduce a bandwidth (e.g., via reallocating one or more radio frequency spectrum bands) for a UE 115. In some cases, reducing the bandwidth may reduce available resources (e.g., time and frequency resources) for the UE 115 to use for wireless communications (e.g., uplink transmissions, downlink reception). Time resources may include symbol periods (e.g., OFDM symbols), mini-slots, slots, subframes, frames, etc., while frequency resources may include, subcarriers, carriers, etc. The UE 115 may be configured to conserve the resources by reusing the resources for various operations (e.g., for uplink transmissions, downlink reception).

In the wireless communications system 100, a base station 105 may transmit, and a UE 115 may, receive downlink control signaling. In some examples, the downlink control signaling may be carried semi-statically using RRC or dynamically using medium access control-control element (MAC-CE) or downlink control information (DCI). The UE 115 may receive the downlink control signaling on a physical control channel (e.g., a physical downlink control channel (PDCCH)). A control region (e.g., a CORESET) for a physical control channel may be defined by a number of symbol periods and may extend across a bandwidth or a subset of the bandwidth. In some cases, one or more CORESET resources may be configured for the DCI. These resources may correspond to a search space.

A UE 115 may monitor or search control regions for control information (e.g., the DCI) according to one or more search space sets, and each search space set may include one or multiple control channel candidates in one or more aggregation levels arranged in a cascaded manner. In some cases, the CORESET resources may or may not be utilized by the UE 115, and thereby time and frequency resources of the wireless communications system 100 are wasted. The UE 115 may consume unnecessary power while blind decoding the control channel candidates (e.g., PDCCH candidates) in one or more search spaces. In some cases, a UE 115 may experience added latency for receiving the downlink control signaling due to a periodicity of the one or more search spaces. For example, the UE 115 may wait according to a search space periodicity before monitoring for the control information (e.g., the DCI) in the search space.

In some cases, due to limited bandwidth, efficient use of resources is particularly important, and transmissions of a relatively small number of DCI bits can result in a relatively large amount of DCI overhead that inefficiently uses resources. Thus, control signaling via DCI on PDCCH may be resource and power inefficient to send small number of downlink information control bits. In the wireless communications system 100, a UE 115 may also reduce uplink resources, for example, physical uplink control channel (PUCCH) preconfigured resources for transmitting uplink control information (UCI). This may be achieved by having the UCI carried using other existing signals.

The wireless communications system 100 may support reference signal-based information using index modulation. A base station 105 and a UE 115 may transmit small number of downlink and uplink information bits (e.g., downlink control bits, uplink control bits) using index modulation schemes applied on references signals (e.g., DMRS, SRS, CSI-RS, PRACH, SL-RS). A base station 105 and a UE 115 may transmit reference signal transmissions (e.g., DMRS, SRS, CSI-RS, PRACH, SL-RS) using reference signal index modulation, in which a set of information bits (e.g., downlink control bits, uplink control bits) are split into at least two subset of information bits.

The first subset can be conveyed implicitly via activation of subcarriers using frequency domain index modulation, activation of antennas via spatial domain index modulation, or activation of symbol periods in a time domain. In contrast, the second subset can be modulated using amplitude and phase modulation schemes, among other examples. As a result, a subset of reference signal resources, for example, subcarriers, antennas, time slots or channel states, are used for the reference signal transmissions. Thus, the other reference signals resources are unused. Some index modulation schemes may not provide sufficient reliability. To address these shortcomings, a base station 105 and a UE 115 may support a multi-mode reference signal index modulation scheme, in which some or all reference signal resources are capable of being utilized to convey information bits, as described herein.

Figure 2:
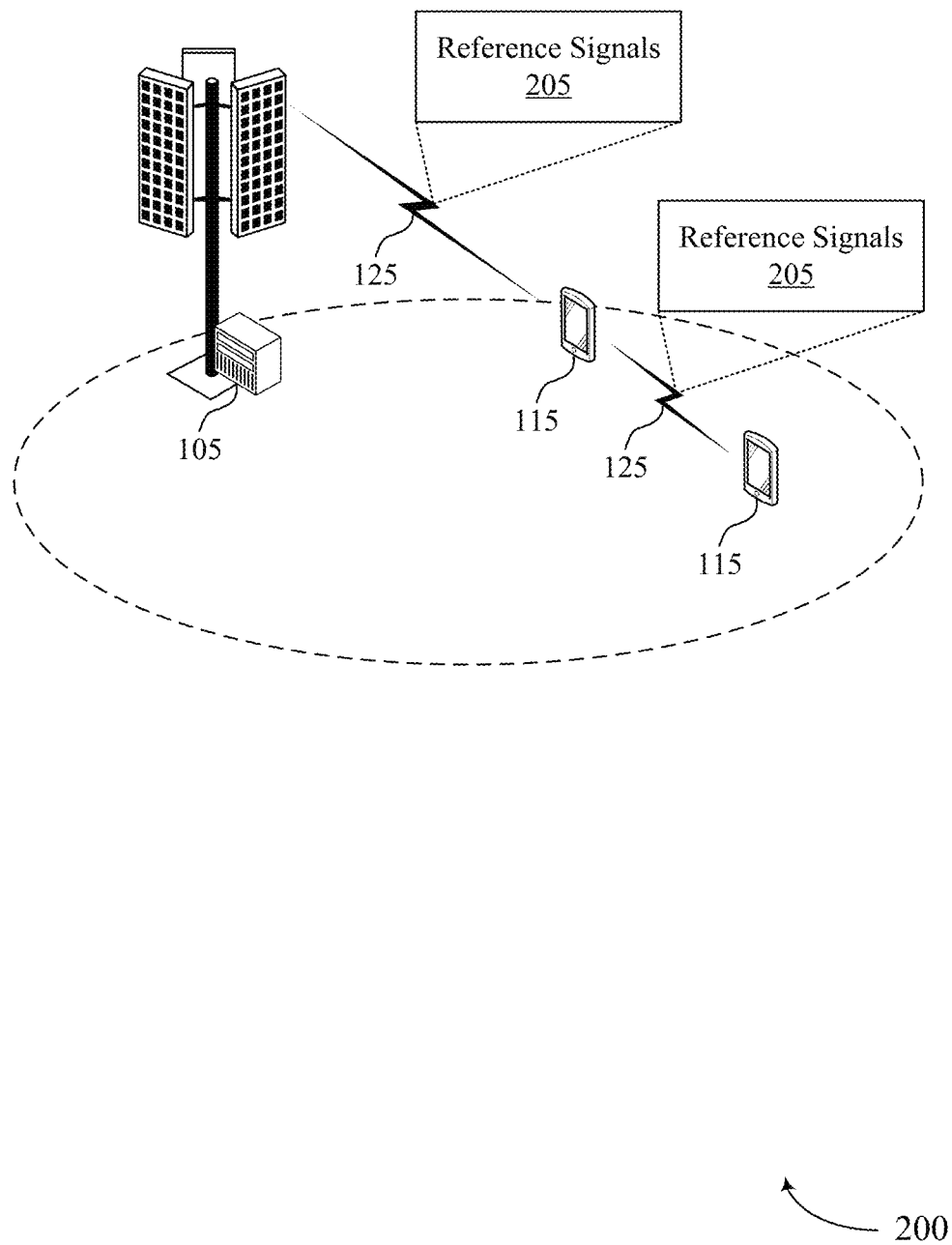

FIG. 2 illustrates an example of a wireless communications system 200 that supports multi-mode reference signal based information using index modulation in accordance with aspects of the present disclosure. The wireless communications system 200 may support multiple radio access technologies including 4G systems such as LTE systems, LTE-A systems, or LTE-A Pro systems, and 5G systems, which may be referred to as NR systems. The wireless communications system 200 may implement aspects of the wireless communications system 100. For example, the wireless communications system 200 may include a base station 105 and a UE 115, which may be examples of the corresponding devices described with reference to FIG. 1. The base station 105 and the UE 115 may be configured to support wireless communications using an index modulation scheme. For example, the base station 105 and the UE 115 may convey information bits (e.g., downlink control bits, uplink control bits) using the index modulation scheme.

As part of index modulation, the base station 105 and the UE 115 may generate a bit sequence (also referred to as bit stream) including a set of information bits, which may be divided into two subset of information bits. The base station 105 and the UE 115 may convey the first subset of information bits using source-based index modulation. In some examples, the first subset of information bits can be conveyed implicitly by the base station 105 and the UE 115 via activation of subcarriers using frequency domain index modulation. In some other examples, the first subset of information bits can be conveyed implicitly by the base station 105 and the UE 115 via activation of antennas via spatial domain index modulation. In other examples, the first subset of information bits can be conveyed implicitly by the base station 105 and the UE 115 via activation of symbol periods in a time domain. Additional information bits may be conveyed implicitly by the index usage or activation patterns.

Alternatively, the base station 105 and the UE 115 may convey the first subset of information bits using media-based index modulation. For example, the first subset of information bits can be conveyed implicitly by the base station 105 and the UE 115 via channel domain index modulation. In some cases, a subset of resources, for example, subcarriers, antennas, time slots or channel states, are used for conveying the information bits. The base station 105 and the UE 115 may convey the second subset of information bits by modulating the second subset of information bits using a modulation and coding scheme. For example, the second subset of information bits can be modulated using an amplitude and phase modulation and coding schemes, among other examples (e.g., any other means of orthogonality).

The base station 105 and the UE 115 may support conveying information bits using a reference signal index modulation scheme, which uses reference signal transmissions (e.g., reference signals 205) using particular resources or reference signal sequences, or both, to convey the information bits. Examples of reference signals 205 include CSI-RS, SRS, DMRS, PRACH, SL-RS, and the like. In some cases, the base station 105 and the UE 115 may support an on-off-keying operation to convey information bits. For example, the base station 105 and the UE 115 may modulate one or more subcarriers via a modulation and coding scheme (e.g., quadrature amplitude modulation (QAM)), and indices of these activated one or more subcarriers in each time resource (e.g., symbol) may be determined by corresponding bit values of an on-off keying bit sequence (or stream).

The base station 105 and the UE 115 may use reference signals resources, for example CSI-RS resources, SRS resources, or other reference signals, to support an on-off-keying operation to convey information bits. In an on-off-keying operation, the base station 105 and the UE 115 may activate a subset of reference signal resources (e.g., CSI-RS resources, SRS resources, etc.) based on the first subset of information bits. The subset of reference signal resources may also be used for the respective reference signal transmission (e.g., reference signal 205 transmission). The base station 105 and the UE 115 may refrain from activating other configured resources. As such, the other configured resources are not activated and are kept unused by the associated reference signal 205 transmission. The activated reference signal resources (e.g., CSI-RS resources, SRS resources, etc.) may include a combination of one or more of the following: transmission configuration indicator (TCI) states (e.g., one or more directional beams) in a spatial domain, subcarriers or resource blocks in a frequency domain, and symbol periods in a time domain (e.g., if symbol period repetition is enabled).

Within the active reference signal resources (e.g., CSI-RS resources, SRS resources, etc.), the base station 105 and the UE 115 may transmit additional information bits based on, for example, a reference signal sequence (e.g., a CSI-RS sequence, an SRS sequence). The base station 105 and the UE 115 may use the reference signal sequence based on an initialization equation used for a reference signal sequence generator (e.g., a CSI-RS sequence generator, an SRS sequence generator, etc.). In some examples, the base station 105 and the UE 115 may transmit additional information bits based on, for example, a reference signal port (e.g., a CSI-RS port, an SRS port). In other examples, the base station 105 and the UE 115 may transmit additional information bits based on, for example, a reference signal density in a frequency domain.

For example, the base station 105 may transmit additional information bits based on a CSI-RS density in a frequency domain. The UE 115 may also transmit additional information bits based on an SRS and SL-RS density in a frequency domain, among other examples. The base station 105 and the UE 115 may alternatively transmit additional information bits based on, for example, a time domain or frequency domain resource allocation within a resource block. In some examples, the base station 105 and the UE 115 may alternatively transmit additional information bits based on, for example on a bandwidth allocation. The base station 105 and the UE 115 may transmit additional information bits based on, for example, a resource mapping in a resource grid (e.g., 2 symbols in 1 or 2 slots).

Figure 3:
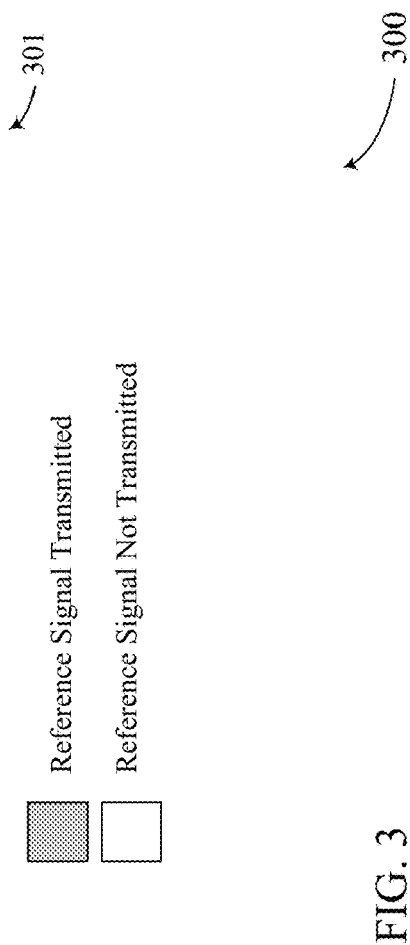

FIG. 3 illustrates an example of a modulation scheme 300 that supports multi-mode reference signal based information using index modulation in accordance with aspects of the present disclosure. In some examples, the modulation scheme 300 may implement aspects of the wireless communications system 100 and the wireless communications system 200 as described in FIGS. 1 and 2, respectively. For example, the modulation scheme 300 may be a spatial domain index modulation and sequence-based modulation scheme. In the example of FIG. 3, a reference signal resource set 301 (e.g., a downlink resource set or an uplink resource set) may be configured with one or more reference signal resources r (e.g., downlink reference signal resources or uplink reference signal resources), which may correspond to one or more beams b. In some examples, the reference signal resource set 301 may be, for example, a CSI-RS resource set and the reference signal resources may be CSI-RS resources. In some other examples, the reference signal resource set 301 may be an SRS resource set and the reference signal resources may be SRS resources. In other examples, the reference signal resource set 301 may be an SL-RS resource set and the reference signal resources may be SL-RS resources, for example, in D2D wireless communication (e.g., between at least two UEs).

A base station 105 and a UE 115 may convey a set of information bits 305, which may split into a first subset of information bits 310 and a second subset of information bits 315. In the example of FIG. 3, x bits may be conveyed of the first subset of information bits 310 using the one or more reference signal resources r (e.g., via one or more beams b) by on-off keying the bits. In some examples, these bits may be equiprobable. The information bits 305 may have x/2 1's (i.e., x/2 beams activated). The base station 105 and the UE 115 may convey the second subset of information bits 315 according to each activated beam. Each activated beam may use a number of possible orthogonal reference signal sequences (i.e., one out of S possible orthogonal sequences. The number of bits that can be conveyed may be defined by the following expression:

$$L + \frac{L}{2}$$

$\log_2 S$ bits, where L is the number of bits.

In the following example, L may be 16 while S may be 4. For example, the information bits 305 may include 32 bits, which may be segmented into equal parts. In the example of FIG. 3, the first subset of information bits 310 and the second subset of information bits 315 may each include 16 bits. Based on each bit value for the first subset of information bits 310, the base station 105 may activate a downlink reference signal resource (e.g., a CSI-RS resource, a DMRS resource). For each bit value one "1" for the first subset of information bits 310, the base station 105 may activate a respective TCI state and transmit, to the UE 115, a downlink reference signal (e.g., a CSI-RS, a DMRS) on a respective downlink references signal resource (e.g., a CSI-RS resource, a DMRS resource). Otherwise, for each bit value zero "0" for the first subset of information bits 310, the base station 105 may not activate a respective TCI state and not transmit, to the UE 115, a downlink reference signal (e.g., a CSI-RS, a DMRS) on a respective downlink references signal resource (e.g., a CSI-RS resource, a DMRS resource).

The UE 115 may identify the first subset of information bits 310 based on activated downlink reference signal resources associated with received downlink reference signals. When conveying the second subset of information bits 315, the base station 105 may use different downlink reference signal sequences (e.g., CSI-RS sequences, DMRS sequences). In some examples, the base station 105 may use four different CSI-RS sequences or DMRS sequences. The UE 115 may thereby detect a downlink reference signal sequence (e.g., a CSI-RS sequence, a DMRS sequence) associated with a respective downlink reference signal resource and determine bits for the second subset of information bits 315 based on the respective downlink reference signal sequence. For example, a first CSI-RS or DMRS sequence may correspond to bits "00", a second CSI-RS or DMRS sequence may correspond to bits "01", a third CSI-RS or DMRS sequence may correspond to bits "10", and a fourth CSI-RS or DMRS sequence may correspond to bits "11".

Likewise, the UE 115 may perform one or more of the above operations when conveying information bits to the base station 105 or another UE 115. For example, the UE 115 may activate an uplink reference signal resource (e.g., an SRS resource, an SL-RS resource, a PRACH resource). For example, for each bit value one "1" for the first subset of information bits 310, the UE 115 may activate a respective TCI state and transmit, to the base station 105, an uplink reference signal (e.g., an SRS, a DMRS, a PRACH) on a respective uplink references signal resource (e.g., an SRS resource, a DMRS resource, a PRACH resource). Otherwise, for each bit value zero "0" for the first subset of information bits 310, the UE 115 may not activate a respective TCI state and not transmit, to the base station 105, an uplink reference signal (e.g., an SRS, a DMRS, a PRACH) on a respective uplink references signal resource (e.g., an SRS resource, a DMRS resource, a PRACH resource).

The base station 105 may likewise identify the first subset of information bits 310 based on activated uplink reference signal resources associated with received uplink reference signals. When conveying the second subset of information bits 315, the UE 115 may use different uplink reference signal sequences (e.g., SRS sequences, DMRS sequences, PRACH sequences). In some examples, the UE 115 may use four different SRS, DMRS, or PRACH sequences. The base station 105 may thereby detect an SRS, DMRS, or PRACH sequence associated with a respective SRS, DMRS, or PRACH resource and determine bits for the second subset of information bits 315 based on the respective SRS, DMRS, or PRACH sequences. For example, a first SRS, DMRS, or PRACH sequence may correspond to bits "00", a second SRS, DMRS, or PRACH sequence may correspond to bits "01", a third SRS, DMRS, or PRACH sequence may correspond to bits "10", and a fourth SRS, DMRS, or PRACH sequence may correspond to bits "11".

Figure 4:
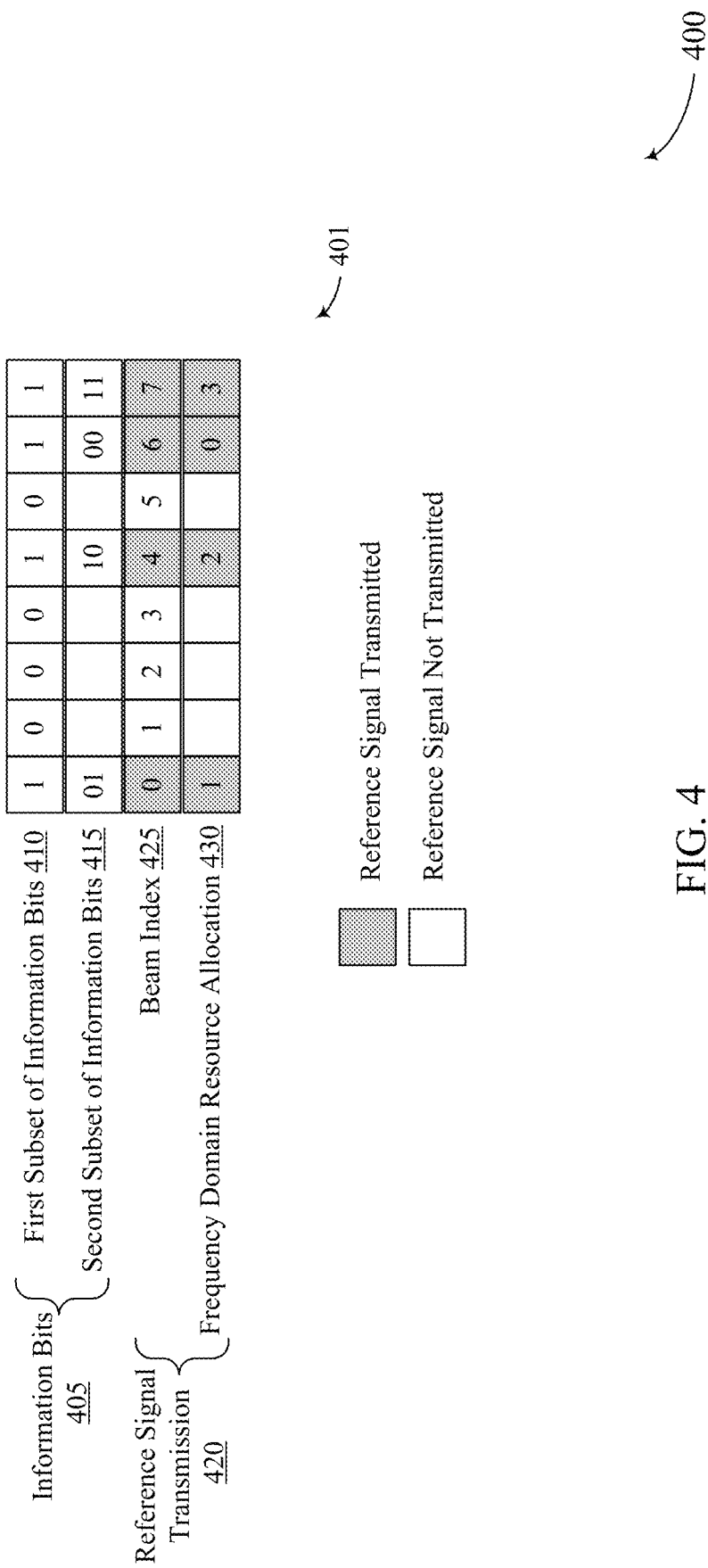

FIG. 4 illustrates an example of a modulation scheme 400 that supports multi-mode reference signal based information using index modulation in accordance with aspects of the present disclosure. In some examples, the modulation scheme 400 may implement aspects of the wireless communications system 100 and the wireless communications system 200 as described in FIGS. 1 and 2, respectively. The modulation scheme 400 include a time domain index modulation and a frequency domain location within resource block modulation scheme. In the example of FIG. 4, a reference signal resource set 401 (e.g., a downlink resource set, an uplink resource set) may be configured with a one or more reference signal resources r (e.g., downlink reference signal resources, uplink reference signal resources), which may correspond to one or more beams b (e.g., downlink beams, uplink beams, sidelink beams) with repetition. In some examples, the reference signal resource set 401 may be, for example, a CSI-RS resource set and the reference signal resources may be one or more CSI-RS resources. In some other examples, the reference signal resource set 401 may be an SRS resource set and the reference signal resources may be one or more SRS resources. In other examples, the reference signal resource set 401 may be an SL-RS resource set and the reference signal resources may be SL-RS resources.

A base station 105 and a UE 115 may convey a set of information bits 405, which may split into a first subset of information bits 410 and a second subset of information bits 415. In the example of FIG. 4, x bits may be conveyed of the first subset of information bits 410 using one or more reference signal resources r (e.g., via one or more beams b) by on-off keying the bits. The information bits 405 may include x/2 1's (i.e., x/2 beams activated). The base station 105 and the UE 115 may convey the second subset of information bits 415 according to each activated beam. Each activated beam may use an orthogonal reference signal sequence (e.g., one out of S possible orthogonal sequences). The number of bits that can be conveyed may be defined by the following expression:

$$L + \frac{L}{2}$$

$\log_2 S$ bits, where L is the number of bits.

In the following example, L may be 8 while S may be 2. For example, the information bits 405 may include 12 bits, which may be split into two parts. In the example of FIG. 4, the first subset of information bits 410 may include 8 bits and the second subset of information bits 415 may include 4 bits. Based on each bit value for the first subset of information bits 410, the base station 105 may activate a respective directional beam corresponding to a beam index 425. For each bit value one "1" for the first subset of information bits 410, the base station 105 may activate a respective directional beam and transmit, to the UE 115, a downlink reference signal (e.g., a CSI-RS, a DMRS) on the respective beam. Otherwise, for each bit value zero "0" for the first subset of information bits 410, the base station 105 may not activate a respective directional beam corresponding to a beam index and not transmit, to the UE 115, a downlink reference signal (e.g., a CSI-RS, a DMRS) on the respective beam.

The UE 115 may identify bits for the first subset of information bits 410 based on activated beams associated with the received downlink reference signal. When conveying the second subset of information bits 415, the base station 105 may use different frequency domain resource allocation 430. The UE 115 may thereby detect a downlink reference signal associated with a respective frequency domain resource allocation 430 and determine bits for the second subset of information bits 415 based on the respective frequency domain resource allocation 430. For example, a first frequency domain resource allocation may correspond to bit "0", while a second frequency domain resource allocation may correspond to bit "1". Similarly, one or more of the above operations may be performed by the UE 115 using uplink reference signals or sidelink reference signals.

With reference to FIGS. 3 and 4, the first subset of information bits (e.g., part 1 information bits) may be equiprobable, these information bits may thereby have L/2 1's (i.e., L/2 beams activated). In some cases, there may be a possibility that the number of 1's is not L/2, if the second subset of information bits (e.g., part 2 information) is $$\frac{L}{2}$$

$\log_2 S$ bits. If the number of 1's>L/2, then all of the second subset of information bits (e.g., part 2 information bits) may be transmitted. However, some references signal resources (e.g., CSI-RS resources, DMRS resources, SRS resources) may be un-modulated. Otherwise, if the number of 1's<L/2, then not all of the second subset of information bits (e.g., part 2 information bits) can be transmitted. As a result, this may lead to inconsistent and variable number of bits transmitted by the base station 105 and the UE 115. The base station 105 and the UE 115 may, in some examples, be configured to use a fixed number of bits known to both the base station 105 and the UE 115 to provide a consistent number of bits transmitted by the base station 105 and the UE 115.

Figure 5:
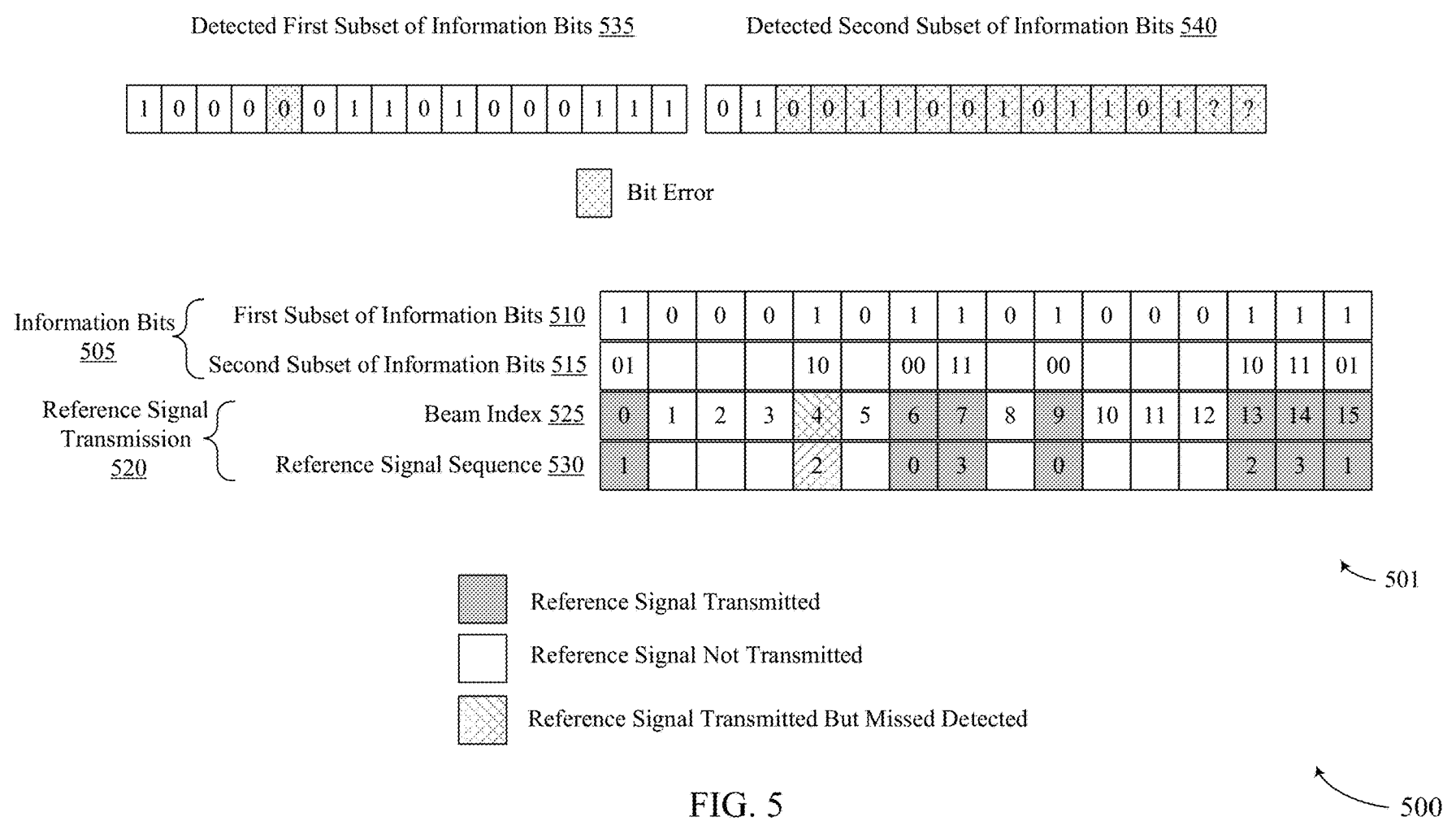

FIG. 5 illustrates an example of a modulation scheme 500 that supports multi-mode reference signal based information using index modulation in accordance with aspects of the present disclosure. In some examples, the modulation scheme 500 may implement aspects of the wireless communications system 100 and the wireless communications system 200 as described in FIGS. 1 and 2, respectively. For example, the modulation scheme 500 may be a spatial domain index modulation and sequence-based modulation scheme. In the example of FIG. 5, a reference signal resource set 501 (e.g., a downlink resource set, an uplink resource set) may be configured with a number of reference signal resources (e.g., downlink reference signal resources, uplink reference signal resources), which may correspond to respective beams (e.g., uplink beams, downlink beams, sidelink beams).

The reference signal resource set 501 may be, for example, a CSI-RS resource set and the reference signal resources may be one or more CSI-RS resources. In some other examples, the reference signal resource set 501 may be, for example, a DMRS resource set and the reference signal resources may be one or more DMRS resources. In some other examples, the reference signal resource set 501 may be an SRS resource set or a PRACH resource set, and the reference signal resources may be one or more SRS resources or PRACH resources. In other examples, the reference signal resource set 501 may be an SL resource set and the reference signal resources may be one or more SL-RS resources.

In the example of FIG. 5, a base station 105 and a UE 115 may convey a set of information bits 505 that may be split into a first subset of information bits 510 and a second subset of information bits 515. The first subset of information bits 510 may be conveyed over one or more respective beams corresponding to a beam index 525 by on-off keying the bits. The UE 115 may identify bits for the first subset of information bits 510 based on activated respective beams associated with received downlink reference signals. The base station 105 and the UE 115 may convey the second subset of information bits 515 according to each respective activated beam. For example, each respective activated beam may use a number of possible orthogonal reference signal sequences 530. The UE 115 may thereby detect a downlink reference signal sequence (e.g., a CSI-RS sequence, a DMRS sequence, etc.) associated with a respective beam and determine bits for the second subset of information bits 515 based on the respective downlink reference signal sequence.

In some cases, an incorrect detection of a downlink reference signal resource for the detected first subset of information bits 535 (e.g., part 1 information) might not lead to incorrect detection of the corresponding second subset of information bits 540 (e.g., part 2 information bits), but also to incorrect detection of all subsequent subset of information bits 540 (e.g., part 2 information bits). This effect may have the biggest impact on the block error rate performance. For example, as illustrated in FIG. 5, missed detection for a reference signal transmission (e.g., a CSI-RS resource) may result in the UE 115 having an incorrect detection of all subsequent subset of information bits 540 (e.g., part 2 information bits). In some examples, some of the reference signal might not be utilized causing a lower number of bits that can be transmitted (e.g., $$L + \frac{L}{2}$$

$\log_2 S$ bits). In some examples, unutilized reference signals may result in the UE 115 having less resources for measurement, beam management, etc.

Figure 6:
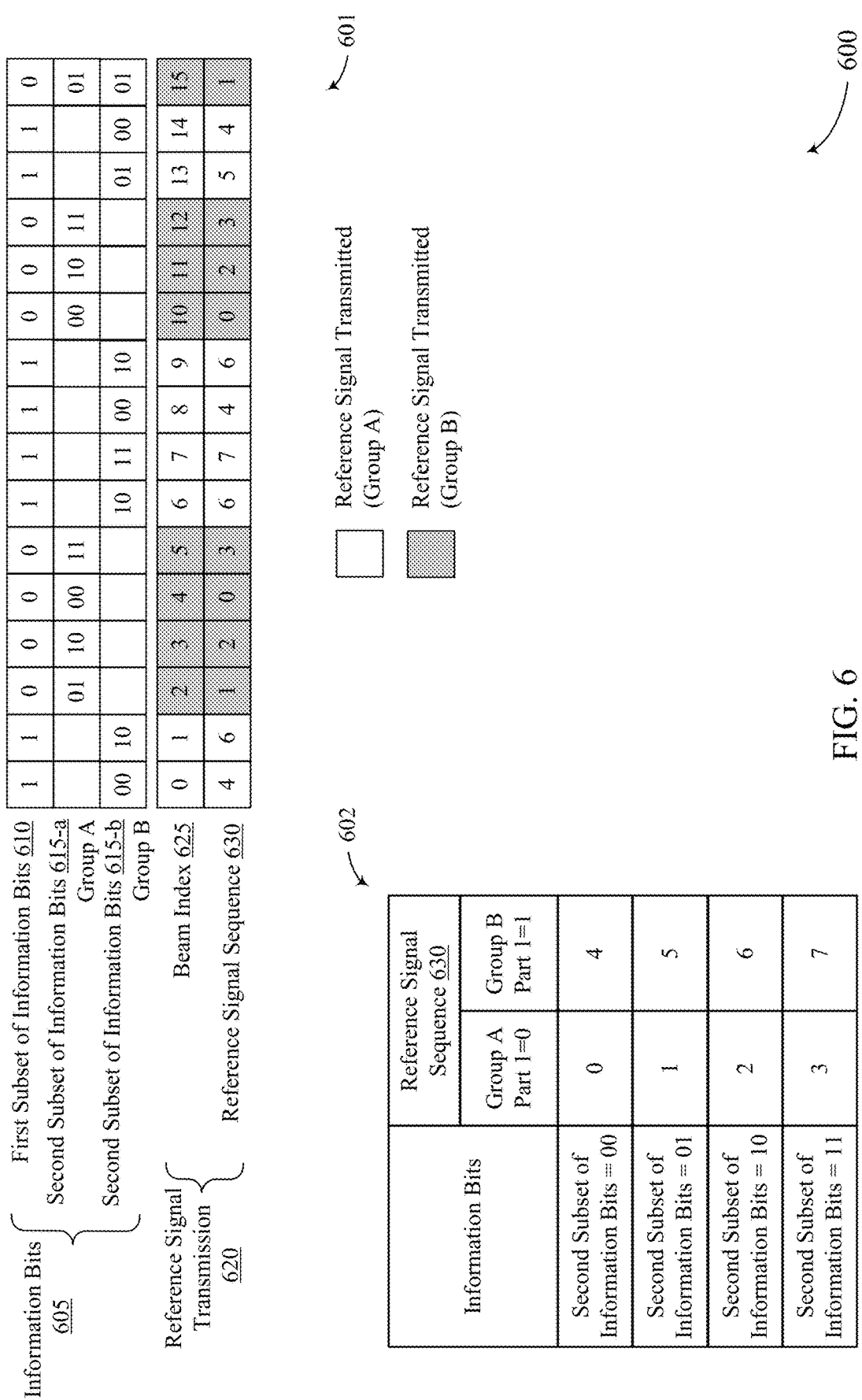

FIG. 6 illustrates an example of a modulation scheme 600 that supports multi-mode reference signal based information using index modulation in accordance with aspects of the present disclosure. In some examples, the modulation scheme 600 may implement aspects of the wireless communications system 100 and the wireless communications system 200 as described in FIGS. 1 and 2, respectively. For example, the modulation scheme 600 may be a multi-mode reference signal index modulation scheme. The modulation scheme 600 may be based on a configuration by a base station 105 and implemented by a UE 115 to promote power saving for the UE 115. The modulation scheme 600 may also be based on a configuration by a base station 105 and implemented by a UE 115 to promote efficiency for higher reliability and lower latency wireless communications, among other benefits.

In the example of FIG. 6, all reference signal resources may be utilized to convey a set of information bits 605 using multi-mode reference signal index modulation. A reference signal resource set 601, for example, a downlink resource set or an uplink resource set may be configured with a number of reference signal resources (e.g., downlink reference signal resources, uplink reference signal resources), which may correspond to respective beams (e.g., uplink beams, downlink beams, sidelink beams), as described herein. A base station 105 and a UE 115 may use L reference signal resources of the reference signal resource set 601 and each of the reference signal resources may have at least one orthogonal property from a set of S orthogonal properties. The reference signal resources may be divided into G groups, with each group having the at least one orthogonal property from the set of S orthogonal properties. That is, each group may have at least one distinguishable orthogonal property and thereby each group may support $\log_2 S$ bits.

The set of information bits 605 may be split into a first subset of information bits 610 and a second subset of information bits 615. Because there are G possible groups, each reference signal resource may carry $\lceil \log_2(G) \rceil$ bits. In some examples, a base station 105 and a UE 115 may convey the first subset of information bits 610 using spatial domain index modulation. In some other examples, a base station 105 and a UE 115 may convey the first subset of information bits 610 using frequency domain index modulation (e.g., of subcarriers, resource blocks). In other examples, a base station 105 and a UE 115 may convey the first subset of information bits 610 using time domain index modulation (e.g., of symbol periods if repetition is enabled). A base station 105 and a UE 115 may convey the second subset of information bits 615 via reference signal sequences, reference signal ports, reference signal density (e.g., comb structure), resource block or bandwidth allocation, or resource mapping, or any combination thereof. The total number of bits conveyed of the set of information bits 605 can thereby be defined as $L \times \lceil \log_2(G) \rceil$ bits of the first subset of information bits 610 plus $L \times \log_2 S$ bits of the second subset of information bits 615.

In the example of FIG. 6, L may be 16, S may be 4, and G may be 2. A base station 105 or a UE 115 may convey the first subset of information bits 610 using spatial domain index modulation. For example, the first subset of information bits 610 may include 16 bits. Based on each bit value for the first subset of information bits 610, the base station 105 or the UE 115 may activate a respective directional beam corresponding to a beam index 625. For each bit value one "1" for the first subset of information bits 610, the base station 105 or the UE 115 may activate a respective directional beam and transmit a reference signal (e.g., a CSI-RS, a DMRS, a PRACH, an SRS, an SL-RS) on the respective beam. Otherwise, for each bit value zero "0" for the first subset of information bits 610, the base station 105 or the UE 115 may not activate a respective directional beam corresponding to a beam index 625 and not transmit a reference signal (e.g., a CSI-RS, a DMRS, a PRACH, an SRS, an SL-RS) on the respective beam.

When conveying the second subset of information bits 615, the base station 105 or the UE 115 may use different reference signal sequences 630 (e.g., CSI-RS sequences, SRS sequences, DMRS sequences, PRACH sequences). The second subset of information bits 615 may be divided into G groups, such as two groups, for example, a second subset of information bits 615-a (e.g., Group A) and a second subset of information bits 615-b (e.g., Group B). The base station 105 or the UE 115 may encode the reference signal transmission 620 to include the second subset of information bits 615 by mapping the second subset of information bits 615 to a respective reference signal sequence 630. A base station 105 or a UE 115 may identify the first subset of information bits 610 and based on the respective reference signal sequence 630 may identify the second subset of information bits 615 encoded in the reference signal transmission 620.

A base station 105 or a UE 115 may identify the second subset of information bits 615 encoded in the reference signal transmission 620 using the table 602, which may map respective reference signal sequences 630 to the second subset of information bits 615-a (e.g., Group A) and the second subset of information bits 615-b (e.g., Group B) based on a bit value of a respective first subset of information bits 610. For example, if a respective bit value associated with the first subset of information bits 610 has a bit value "1" (i.e., part 1=0) then a respective bit value associated with the second subset of information bits 615-a may have a bit value "00" based on a first respective reference signal sequence 630 (e.g., "0"); a bit value "01" based on a second respective reference signal sequence 630 (e.g., "1"); a bit value "10" based on a third respective reference signal sequence 630 (e.g., "2"); or a bit value "11" based on a fourth respective reference signal sequence 630 (e.g., "3"). Alternatively, if a respective bit value associated with the first subset of information bits 610 has a bit value "1" (i.e., part 1=1) then a respective bit associated with the second subset of information bits 615-b may have a bit value "00" based on a first respective reference signal sequence 630 (e.g., "4"); a bit value "01" based on a second respective reference signal sequence 630 (e.g., "5"); a bit value "10" based on a third respective reference signal sequence 630 (e.g., "6"); or a bit value "11" based on a fourth respective reference signal sequence 630 (e.g., "7").

The total number of bits conveyed by a base station 105 or a UE 115 may thereby be defined by the following expression: $L(\lceil \log_2(G) \rceil + \log_2 S)$, which may be 48 bits, for instance, in the example of FIG. 6. By supporting multi-mode reference signal index modulation, a base station 105 and a UE 115 may avoid using inconsistent number of bits by having the number of bits being constant since the activated reference signal resources are known. The base station 105 and the UE 115 may also reduce error propagation because an error is localized to the corresponding reference signal resource. The base station 105 and the UE 115 may, additionally or alternatively, promote low spectral efficiency utilization. For example, because all reference signal resources are now utilized and the number of bits is increased from $L (1+\frac{1}{2} \log_2 S)$ to $L(\lceil \log_2(G) \rceil + \log_2 S)$ bits.

Figure 7:
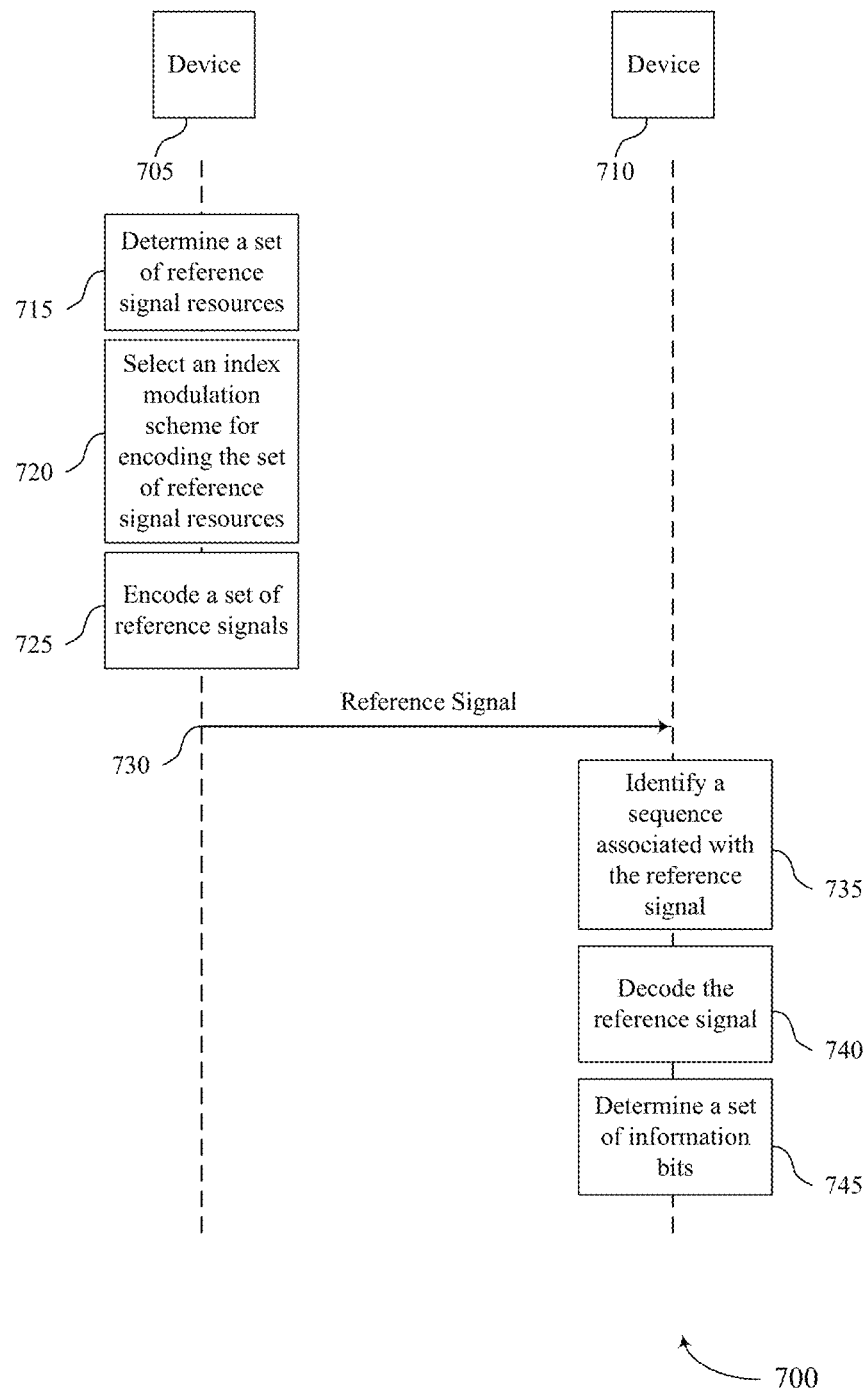
FIG. 7 illustrates an example of a process flow that supports multi-mode reference signal based information using index modulation in accordance with aspects of the present disclosure.

FIG. 7 illustrates an example of a process flow 700 that supports multi-mode reference signal based information using index modulation in accordance with aspects of the present disclosure. The process flow 700 may implement aspects of the wireless communications system 100 and the wireless communications system 200 described with reference to FIGS. 1 and 2, respectively. The process flow 700 may also implement aspects of the various modulation schemes described with reference to FIGS. 3 through 6, respectively. The process flow 700 may be based on a configuration by a base station 105 and implemented by a UE 115 to promote power saving for the UE 115 by performing wireless communication of multi-mode reference signal based information using index modulation. The process flow 700 may also be based on a configuration by the base station 105 and implemented by the UE 115 to promote high reliability and low latency wireless communications (e.g., higher data rates, higher channel capacity, higher spectral efficiency), among other benefits.

In the following description of the process flow 700, the operations between the device 705 and the device 710 may be transmitted in a different order than the example order shown, or the operations performed by the device 705 and the device 710 may be performed in different orders or at different times. Some operations may also be omitted from the process flow 700, and other operations may be added to the process flow 700. The device 705 and the device 710 may be examples of a base station 105 and a UE 115 as described with reference to FIGS. 1 and 2, respectively. Alternatively, the device 705 and the device 710 may be examples of at least two UEs 115 in wireless communication, for example, of a D2D communication link. The device 705 may be an example of a transmitting device and the device 710 may be an example of a receiving device that use a reference signal index modulation scheme. The type of the device 705 and the device 710 may change on whether the reference signals are transmitted over an uplink communication link, a downlink communication link, or a sidelink communication link.

At 715, the device 705 may determine a set of reference signal resources. For example, the device 705 may determine a set of reference signal resources to convey a set of information bits to the device 710 via one or more reference signals. Examples of set of reference signal resources may include SRS resources, PRACH resources, DMRS resources, CSI-RS resources, or SL-RS resources, etc. In some examples, the reference signal resources may be orthogonal in a time domain, a frequency domain, or a spatial domain, or any combination thereof. As described herein, the device 705 may convey the set of information bits using index modulation and encoding the reference signal resources. The device 705 may split the set of information bits into a first subset of information bits and a second subset of information bits to convey the set of information bits.

At 720, the device 705 may select an index modulation scheme for encoding the set of reference signal resources (e.g., SRS resources, PRACH resources, DMRS resources, CSI-RS resources, or SL-RS resources, etc.). For example, the device 705 may select a first index modulation scheme or a second index modulation scheme for encoding the set of reference signal resources to include the second subset of information bits based on values of the first subset of information bits. At 725, the device 705 may encode a set of reference signals (e.g., SRS, PRACH, DMRS, CSI-RS, or SL-RS, etc.) to include the set of information bits using the first index modulation scheme for a first value of the first subset of information bits and the second index modulation scheme for a second value of the first subset of information bits. At 730, the device 705 may transmit a reference signal (e.g., SRS, PRACH, DMRS, CSI-RS, or SL-RS, etc.) that are encoded to include the set of information bits to the device 710.

At 735, the device 710 may identify a sequence associated with the reference signal (e.g., SRS, PRACH, DMRS, CSI-RS, or SL-RS, etc.). At 740, the device 710 may decode the reference signal. At 745, the device 710 may determine a set of information bits, for example, a first subset of information bits of the set of information bits encoded in the reference signal and a second subset of information bits of the set of information bits encoded in the reference signal based on identifying the sequence. The first subset of information bits may be encoded in the reference signal based on the sequence corresponding to a first group of sequences or a second group of sequences and the second subset of information bits may be encoded in the reference signal based on a mapping between the sequence and one or more values of the second subset of information bits.

Figure 8:
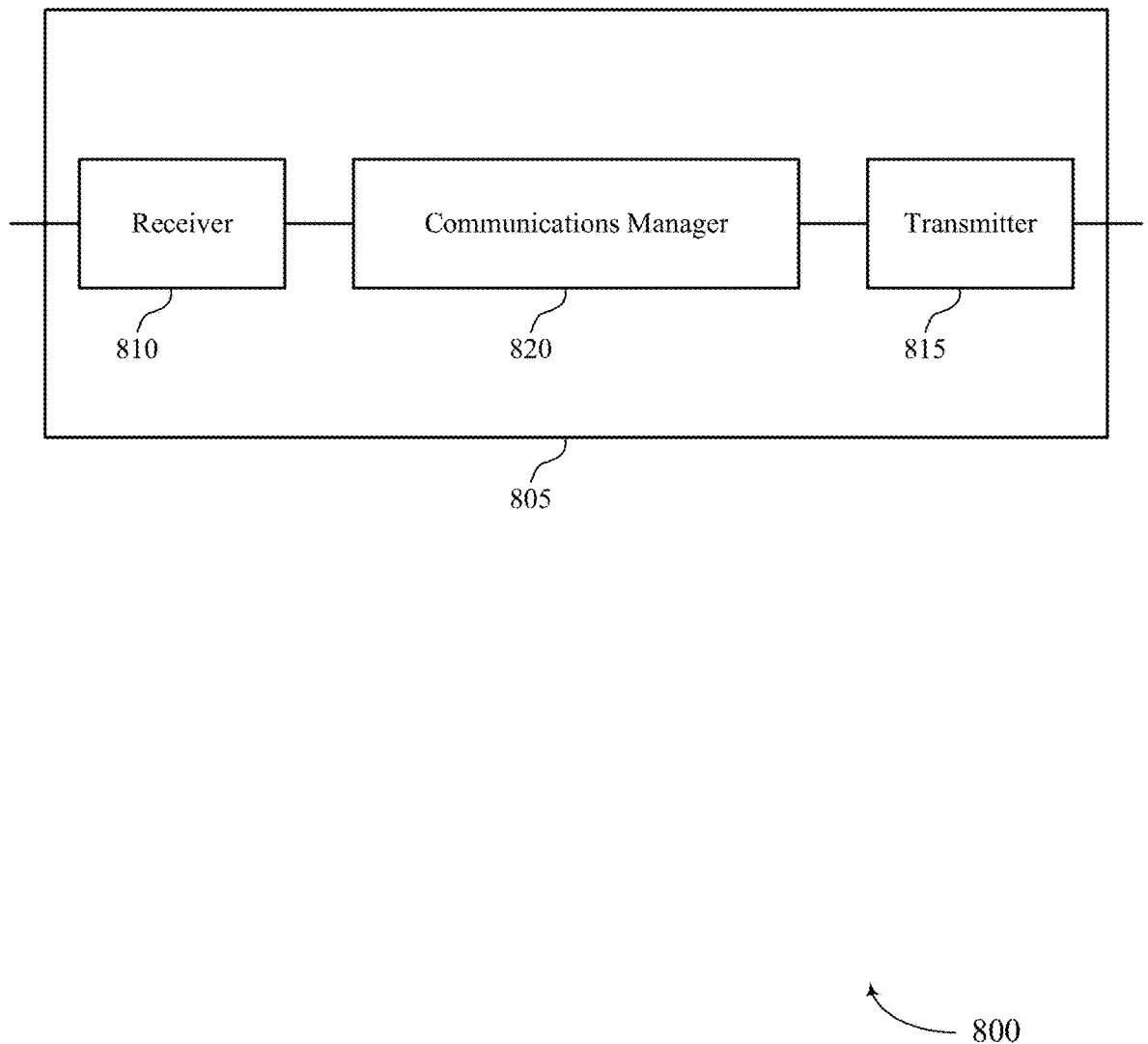
FIGS. 8 and 9 show diagrams of devices that support multi-mode reference signal based information using index modulation in accordance with aspects of the present disclosure.

FIG. 8 shows a diagram 800 of a device 805 that supports multi-mode reference signal based information using index modulation in accordance with aspects of the present disclosure. The device 805 may be an example of aspects of a UE 115 or a base station 105 as described herein. The device 805 may include a receiver 810, a transmitter 815, and a communications manager 820. The device 805 may also include a processor. These components may be in communication with one another (e.g., via one or more buses).

The receiver 810 may provide a means for receiving information such as packets, user data, control information, or any combination thereof associated with various information channels (e.g., control channels, data channels, information channels related to multi-mode reference signal based information using index modulation). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to multi-mode reference signal based information using index modulation). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of multi-mode reference signal based information using index modulation as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at the device 805 (e.g., a first device) in accordance with examples as disclosed herein. For example, the communications manager 820 may be configured as or otherwise support a means for determining a set of reference signal resources to convey a set of information bits to a second device (e.g., a base station, a UE) via one or more reference signals, the set of information bits including a first subset of information bits and a second subset of information bits. The communications manager 820 may be configured as or otherwise support a means for selecting a first index modulation scheme or a second index modulation scheme for encoding the set of reference signal resources to include the second subset of information bits based on values of the first subset of information bits. The communications manager 820 may be configured as or otherwise support a means for encoding a set of reference signals to include the set of information bits using the first index modulation scheme for a first value of the first subset of information bits and the second index modulation scheme for a second value of the first subset of information bits. The communications manager 820 may be configured as or otherwise support a means for transmitting, to the second device, the set of reference signals that are encoded to include the set of information bits.

Additionally or alternatively, the communications manager 820 may support wireless communication at the device 805 (e.g., a first device) in accordance with examples as disclosed herein. For example, the communications manager 820 may be configured as or otherwise support a means for receiving, from a second device (e.g., a base station, a UE 115), a reference signal. The communications manager 820 may be configured as or otherwise support a means for identifying a sequence associated with the reference signal. The communications manager 820 may be configured as or otherwise support a means for decoding the reference signal to determine a first subset of information bits of a set of information bits encoded in the reference signal and a second subset of information bits of the set of information bits encoded in the reference signal based on identifying the sequence, the first subset of information bits encoded in the reference signal based on the sequence corresponding to a first group of sequences or a second group of sequences and the second subset of information bits encoded in the reference signal based on a mapping between the sequence and one or more values of the second subset of information bits.

By including or configuring the communications manager 820 in accordance with examples as described herein, the device 805 (e.g., a processor controlling or otherwise coupled to the receiver 810, the transmitter 815, the communications manager 820, or a combination thereof) may support efficient techniques for conveying information bits. At least one implementation may enable the communications manager 820 to improve data capacity for the device 805 by using a constant number of bits because the activated reference signals are known. Based on implementing the multi-mode reference signal index modulation, one or more processors of the device 805 (for example, processor(s) controlling or incorporated with the communications manager 820) may promote improvements to power consumption, spectral efficiency, higher data rates and, in some examples, may promote enhanced efficiency for high reliability and low latency data communications, among other benefits.

Figure 9:
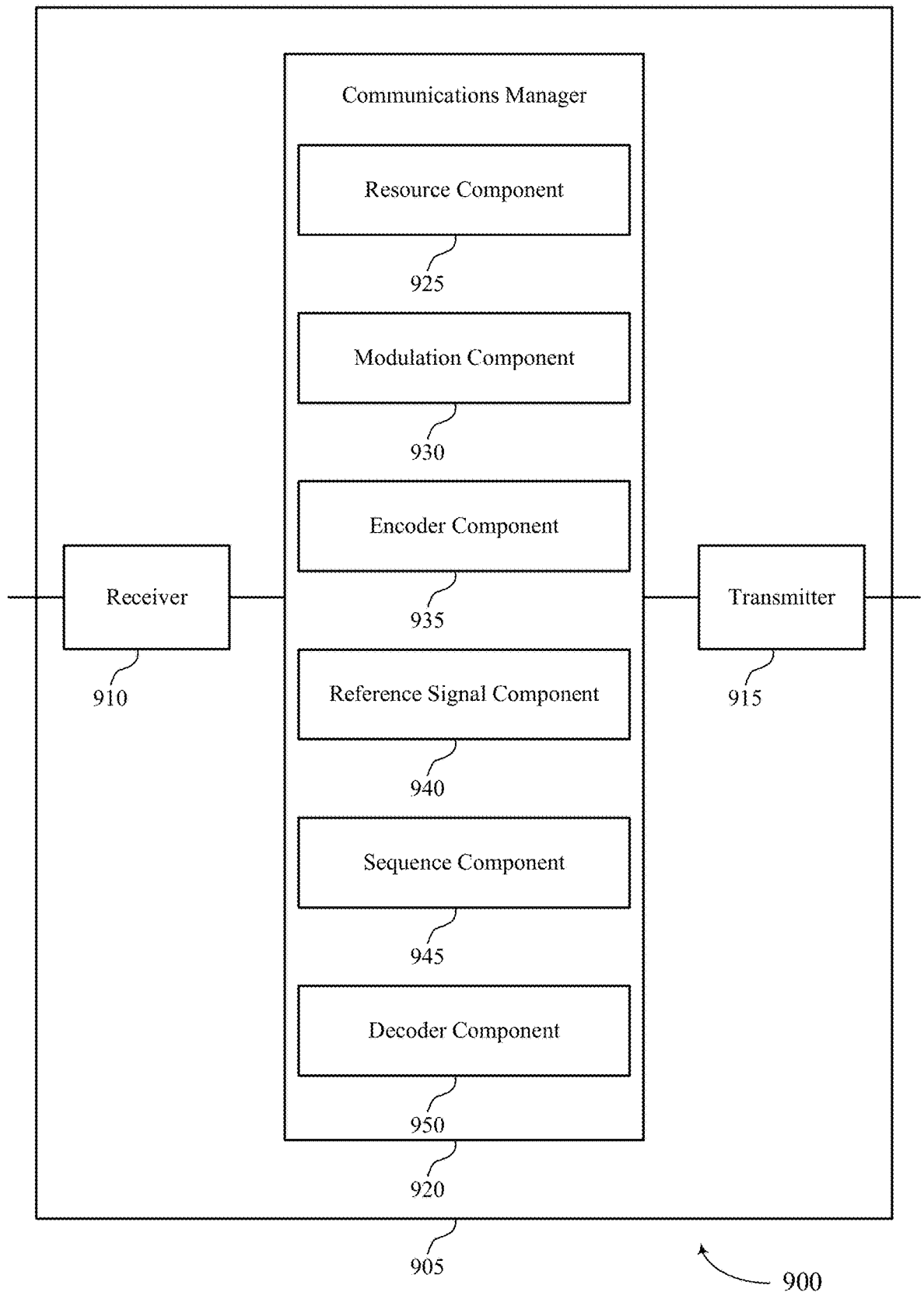

FIG. 9 shows a diagram 900 of a device 905 that supports multi-mode reference signal based information using index modulation in accordance with aspects of the present disclosure. The device 905 may be an example of aspects of a device 805, a UE 115, or a base station 105 as described herein. The device 905 may include a receiver 910, a transmitter 915, and a communications manager 920. The device 905 may also include a processor. These components may be in communication with one another (e.g., via one or more buses).

The receiver 910 may provide a means for receiving information such as packets, user data, control information, or any combination thereof associated with various information channels (e.g., control channels, data channels, information channels related to multi-mode reference signal based information using index modulation). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to multi-mode reference signal based information using index modulation). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of multi-mode reference signal based information using index modulation as described herein. For example, the communications manager 920 may include a resource component 925, a modulation component 930, an encoder component 935, a reference signal component 940, a sequence component 945, a decoder component 950, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at the device 905 (e.g., a first device) in accordance with examples as disclosed herein. The resource component 925 may be configured as or otherwise support a means for determining a set of reference signal resources to convey a set of information bits to a second device via one or more reference signals, the set of information bits including a first subset of information bits and a second subset of information bits. The modulation component 930 may be configured as or otherwise support a means for selecting a first index modulation scheme or a second index modulation scheme for encoding the set of reference signal resources to include the second subset of information bits based on values of the first subset of information bits. The encoder component 935 may be configured as or otherwise support a means for encoding a set of reference signals to include the set of information bits using the first index modulation scheme for a first value of the first subset of information bits and the second index modulation scheme for a second value of the first subset of information bits. The reference signal component 940 may be configured as or otherwise support a means for transmitting, to the second device, the set of reference signals that are encoded to include the set of information bits.

Additionally or alternatively, the communications manager 920 may support wireless communication at the device 905 (e.g., a first device) in accordance with examples as disclosed herein. The reference signal component 940 may be configured as or otherwise support a means for receiving, from a second device, a reference signal. The sequence component 945 may be configured as or otherwise support a means for identifying a sequence associated with the reference signal. The decoder component 950 may be configured as or otherwise support a means for decoding the reference signal to determine a first subset of information bits of a set of information bits encoded in the reference signal and a second subset of information bits of the set of information bits encoded in the reference signal based on identifying the sequence, the first subset of information bits encoded in the reference signal based on the sequence corresponding to a first group of sequences or a second group of sequences and the second subset of information bits encoded in the reference signal based on a mapping between the sequence and one or more values of the second subset of information bits.

Figure 10:
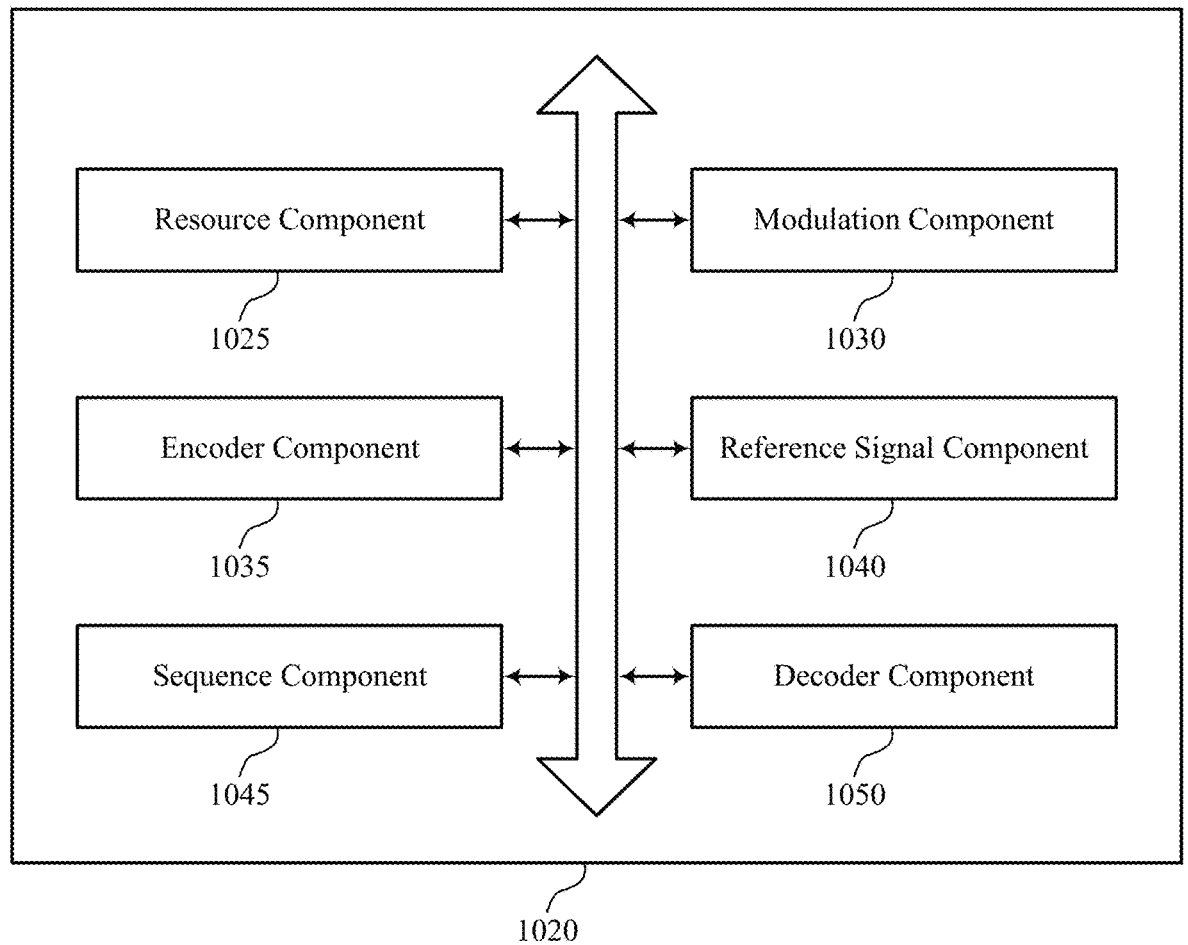
FIG. 10 shows a diagram of a communications manager that supports multi-mode reference signal based information using index modulation in accordance with aspects of the present disclosure.

FIG. 10 shows a diagram 1000 of a communications manager 1020 that supports multi-mode reference signal based information using index modulation in accordance with aspects of the present disclosure. The communications manager 1020 may be an example of aspects of a communications manager 820, a communications manager 920, or both, as described herein. The communications manager 1020, or various components thereof, may be an example of means for performing various aspects of multi-mode reference signal based information using index modulation as described herein. For example, the communications manager 1020 may include a resource component 1025, a modulation component 1030, an encoder component 1035, a reference signal component 1040, a sequence component 1045, a decoder component 1050, or any combination thereof. These components may communicate, directly or indirectly, with one another (e.g., via one or more buses).

The communications manager 1020 may support wireless communication at a first device in accordance with examples as disclosed herein. The resource component 1025 may be configured as or otherwise support a means for determining a set of reference signal resources to convey a set of information bits to a second device via one or more reference signals, the set of information bits including a first subset of information bits and a second subset of information bits. The modulation component 1030 may be configured as or otherwise support a means for selecting a first index modulation scheme or a second index modulation scheme for encoding the set of reference signal resources to include the second subset of information bits based on values of the first subset of information bits. The encoder component 1035 may be configured as or otherwise support a means for encoding a set of reference signals to include the set of information bits using the first index modulation scheme for a first value of the first subset of information bits and the second index modulation scheme for a second value of the first subset of information bits. The reference signal component 1040 may be configured as or otherwise support a means for transmitting, to the second device, the set of reference signals that are encoded to include the set of information bits.

In some examples, to support encoding the set of reference signals, the encoder component 1035 may be configured as or otherwise support a means for encoding the set of reference signals to include the first subset of information bits using a spatial index modulation scheme including mapping the first subset of information bits to one or more directional beams, where transmitting the set of reference signals is based on the spatial index modulation scheme. In some other examples, to support encoding the set of reference signals, the encoder component 1035 may be configured as or otherwise support a means for encoding the set of reference signals to include the first subset of information bits based on a frequency domain index modulation scheme including mapping the first subset of information bits to one or more subcarriers in a frequency domain, where transmitting the set of reference signals is based on the frequency domain index modulation scheme. In other examples, to support encoding the set of reference signals, the encoder component 1035 may be configured as or otherwise support a means for encoding the set of reference signals to include the first subset of information bits based on a time domain index modulation scheme including mapping the first subset of information bits to one or more symbol periods in a time domain, where transmitting the encoded set of reference signals is based on the time domain index modulation scheme.

In some examples, to support encoding the set of reference signals, the encoder component 1035 may be configured as or otherwise support a means for encoding the set of reference signals to include the second subset of information bits based on mapping the second subset of information bits to one or more reference signal sequences, where transmitting the encoded set of reference signals is based on the one or more reference signal sequences. In some other examples, the first index modulation scheme includes a first subset of reference signal sequences that map to values of the second subset of information bits. In some examples, the second index modulation scheme includes a second subset of reference signal sequences that map to the values of the second subset of information bits. In other examples, to support encoding the set of reference signals, the encoder component 1035 may be configured as or otherwise support a means for encoding the set of reference signals to include the second subset of information bits based on mapping the second subset of information bits to one or more reference signal ports, where transmitting the encoded set of reference signals is based on the one or more reference signal ports.

To support encoding the set of reference signals, the encoder component 1035 may be configured as or otherwise support a means for encoding the set of reference signals to include the second subset of information bits based on a reference signal density in one or both of a time domain and a frequency domain, where transmitting the encoded set of reference signals is based on the reference signal density. In some examples, to support encoding the set of reference signals, the encoder component 1035 may be configured as or otherwise support a means for encoding the set of reference signals to include the second subset of information bits based on an allocation of reference signal resources in one or more both of a time domain and a frequency domain in a reference signal resource block, where transmitting the encoded set of reference signals is based on the allocation of reference signal resources in one or more both of the time domain and the frequency domain in the reference signal resource block. In some examples, to support encoding the set of reference signals, the encoder component 1035 may be configured as or otherwise support a means for encoding the set of reference signals to include the second subset of information bits based on an allocation of reference signal resources in one or more both of a time domain and a frequency domain in bandwidth part, where transmitting the encoded set of reference signals is based on the allocation of reference signal resources in one or more both of the time domain and the frequency domain in the bandwidth part.

In some examples, one or more reference signal resources of the set of reference signal resources are orthogonal in a time domain. In some examples, one or more reference signal resources of the set of reference signal resources are orthogonal in a frequency domain. In some examples, one or more reference signal resources of the set of reference signal resources are orthogonal in a spatial domain. In some examples, the first device includes a UE. In some examples, the second device includes a base station. In some examples, a reference signal of the set of reference signals includes a SRS, a PRACH, or a DMRS, or any combination thereof. In some examples, the first device includes a base station. In some examples, the second device includes a UE. In some examples, a reference signal of the set of reference signals includes a CSI-RS or a DMRS, or a combination thereof. In some examples, the first device includes a first UE. In some examples, the second device includes a second UE. In some examples, a reference signal of the set of reference signals includes a SL-RS.

Additionally or alternatively, the communications manager 1020 may support wireless communication at a first device in accordance with examples as disclosed herein. In some examples, the reference signal component 1040 may be configured as or otherwise support a means for receiving, from a second device, a reference signal. The sequence component 1045 may be configured as or otherwise support a means for identifying a sequence associated with the reference signal. The decoder component 1050 may be configured as or otherwise support a means for decoding the reference signal to determine a first subset of information bits of a set of information bits encoded in the reference signal and a second subset of information bits of the set of information bits encoded in the reference signal based on identifying the sequence, the first subset of information bits encoded in the reference signal based on the sequence corresponding to a first group of sequences or a second group of sequences and the second subset of information bits encoded in the reference signal based on a mapping between the sequence and one or more values of the second subset of information bits.

In some examples, to support decoding the reference signal, the decoder component 1050 may be configured as or otherwise support a means for decoding the reference signal to determine the first subset of information bits based on a spatial index demodulation including mapping the first subset of information bits to one or more directional beams. In some examples, to support decoding the reference signal, the decoder component 1050 may be configured as or otherwise support a means for decoding the reference signal to determine the first subset of information bits based on a frequency domain index demodulation including mapping the first subset of information bits to one or more symbol periods in a frequency domain. In some examples, to support decoding the reference signal, the decoder component 1050 may be configured as or otherwise support a means for decoding the reference signal to determine the first subset of information bits based on a time domain index demodulation including mapping the first subset of information bits to one or more symbol periods in a time domain.

In some examples, to support decoding the reference signal, the decoder component 1050 may be configured as or otherwise support a means for decoding the reference signal to determine the second subset of information bits based on mapping the second subset of information bits to one or more reference signal sequences. In some examples, to support decoding the reference signal, the decoder component 1050 may be configured as or otherwise support a means for decoding the reference signal to determine the second subset of information bits based on mapping the second subset of information bits to one or more reference signal ports. In some examples, to support decoding the reference signal, the decoder component 1050 may be configured as or otherwise support a means for decoding the reference signal to determine the second subset of information bits based on a reference signal density in one or both of a time domain and a frequency domain.

In some examples, to support decoding the reference signal, the decoder component 1050 may be configured as or otherwise support a means for decoding the reference signal to determine the second subset of information bits based on an allocation of reference signal resources in one or more both of a time domain and a frequency domain in a reference signal resource block. In some examples, to support decoding the reference signal, the decoder component 1050 may be configured as or otherwise support a means for decoding the reference signal to determine the second subset of information bits based on an allocation of reference signal resources in one or more both of a time domain and a frequency domain in bandwidth part.

The first device includes a base station. In some examples, the second device includes a UE. In some examples, the reference signal includes a SRS, a PRACH, or a DMRS, or any combination thereof. In some examples, the first device includes a UE. In some examples, the second device includes a base station. In some examples, the reference signal includes a CSI-RS or a DMRS, or a combination thereof. In some examples, the first device includes a second UE. In some examples, the second device includes a first UE. In some examples, the reference signal includes a SL-RS.

Figure 11:
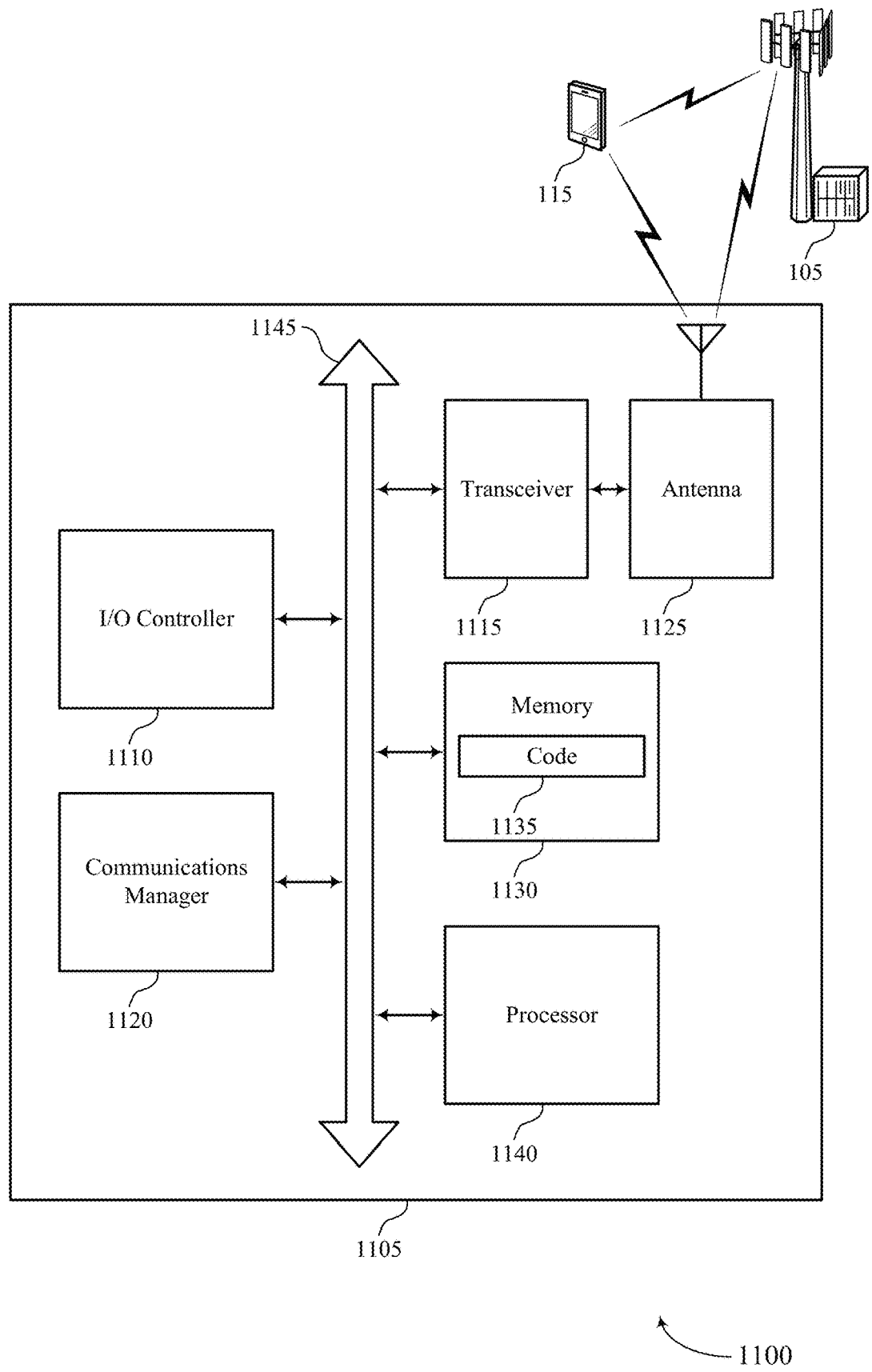
FIG. 11 shows a diagram of a system including a UE that supports multi-mode reference signal based information using index modulation in accordance with aspects of the present disclosure.

FIG. 11 shows a diagram of a system 1100 including a device 1105 that supports multi-mode reference signal based information using index modulation in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting multi-mode reference signal based information using index modulation). For example, the device 1105 or a component of the device 1105 may include a processor 1140 and memory 1130 coupled to the processor 1140, the processor 1140 and memory 1130 configured to perform various functions described herein.

The communications manager 1120 may support wireless communication at the device 1105 (e.g., a first device) in accordance with examples as disclosed herein. For example, the communications manager 1120 may be configured as or otherwise support a means for determining a set of reference signal resources to convey a set of information bits to a second device via one or more reference signals, the set of information bits including a first subset of information bits and a second subset of information bits. The communications manager 1120 may be configured as or otherwise support a means for selecting a first index modulation scheme or a second index modulation scheme for encoding the set of reference signal resources to include the second subset of information bits based on values of the first subset of information bits. The communications manager 1120 may be configured as or otherwise support a means for encoding a set of reference signals to include the set of information bits using the first index modulation scheme for a first value of the first subset of information bits and the second index modulation scheme for a second value of the first subset of information bits. The communications manager 1120 may be configured as or otherwise support a means for transmitting, to the second device, the set of reference signals that are encoded to include the set of information bits.

Additionally or alternatively, the communications manager 1120 may support wireless communication at the device 1105 (e.g., a first device) in accordance with examples as disclosed herein. For example, the communications manager 1120 may be configured as or otherwise support a means for receiving, from a second device, a reference signal. The communications manager 1120 may be configured as or otherwise support a means for identifying a sequence associated with the reference signal. The communications manager 1120 may be configured as or otherwise support a means for decoding the reference signal to determine a first subset of information bits of a set of information bits encoded in the reference signal and a second subset of information bits of the set of information bits encoded in the reference signal based on identifying the sequence, the first subset of information bits encoded in the reference signal based on the sequence corresponding to a first group of sequences or a second group of sequences and the second subset of information bits encoded in the reference signal based on a mapping between the sequence and one or more values of the second subset of information bits.

By including or configuring the communications manager 1120 in accordance with examples as described herein, the device 1105 may support techniques for conveying information bits. At least one implementation may enable the communications manager 1120 to provide more efficient utilization of communication resources for the device 1105 by configuring the device 1105 to use a configured number of bits and activation of reference signals are known. At least another implementation may enable the communications manager 1120 to provide improved coordination between devices including the device 1105 by configuring the device 1105 to convey information bits via multi-mode reference signal index modulation. Based on implementing the multi-mode reference signal index modulation, the device 1105 may experience longer battery life as a result of improved communication reliability and reduced latency of conveying information bits to other devices.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of multi-mode reference signal based information using index modulation as described herein, or the processor 1140 and the memory 1130 may be otherwise configured to perform or support such operations.

Figure 12:
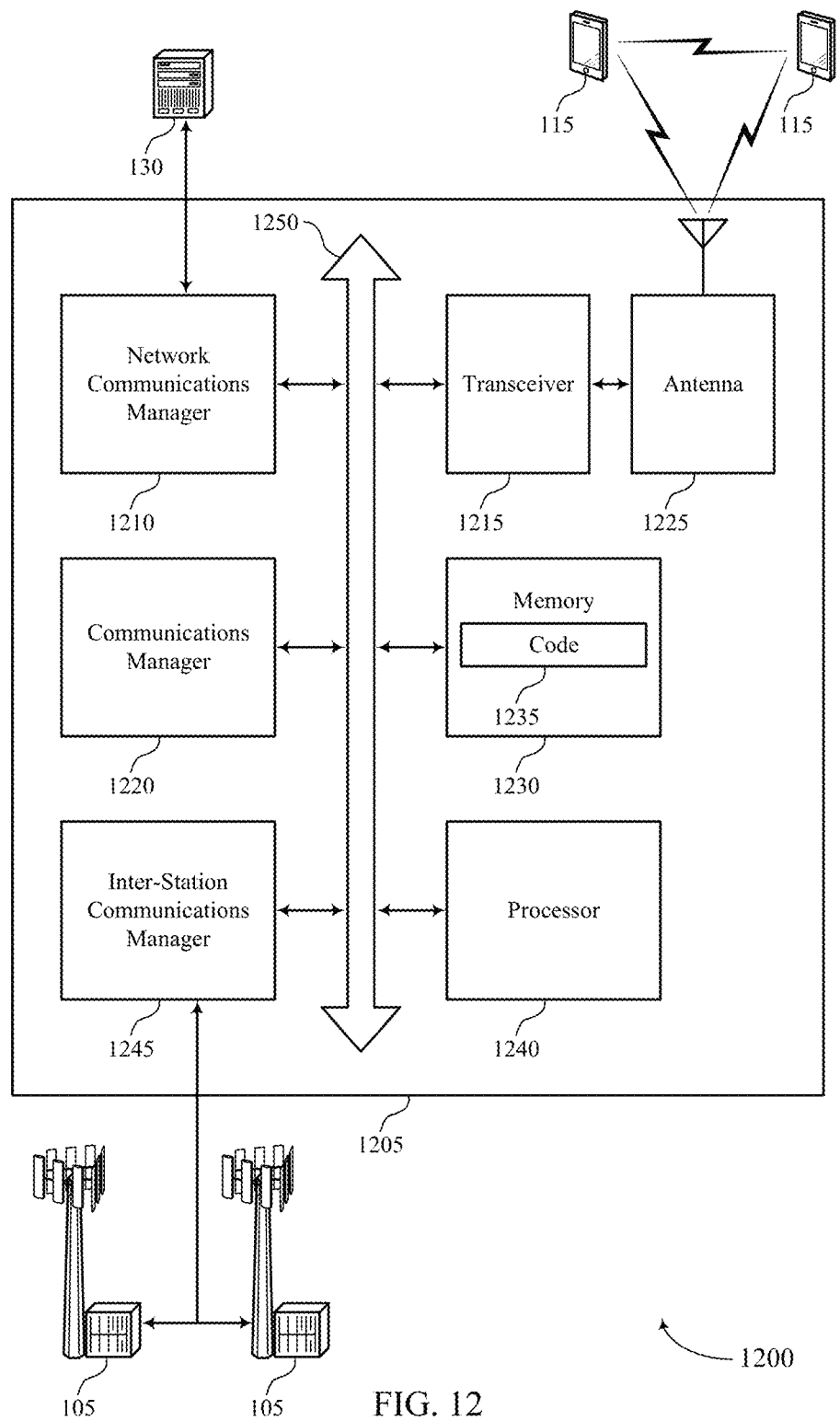
FIG. 12 shows a diagram of a system including a base station that supports multi-mode reference signal based information using index modulation in accordance with aspects of the present disclosure.

FIG. 12 shows a diagram of a system 1200 including a device 1205 that supports multi-mode reference signal based information using index modulation in accordance with aspects of the present disclosure. The device 1205 may be an example of or include the components of a device 805, a device 905, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115. In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 815, a transmitter 915, a receiver 810, a receiver 910, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting multi-mode reference signal based information using index modulation). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105 and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at the device 1205 (e.g., a first device) in accordance with examples as disclosed herein. For example, the communications manager 1220 may be configured as or otherwise support a means for determining a set of reference signal resources to convey a set of information bits to a second device via one or more reference signals, the set of information bits including a first subset of information bits and a second subset of information bits. The communications manager 1220 may be configured as or otherwise support a means for selecting a first index modulation scheme or a second index modulation scheme for encoding the set of reference signal resources to include the second subset of information bits based on values of the first subset of information bits. The communications manager 1220 may be configured as or otherwise support a means for encoding a set of reference signals to include the set of information bits using the first index modulation scheme for a first value of the first subset of information bits and the second index modulation scheme for a second value of the first subset of information bits. The communications manager 1220 may be configured as or otherwise support a means for transmitting, to the second device, the set of reference signals that are encoded to include the set of information bits.

Additionally or alternatively, the communications manager 1220 may support wireless communication at the device 1205 (e.g., a first device) in accordance with examples as disclosed herein. For example, the communications manager 1220 may be configured as or otherwise support a means for receiving, from a second device, a reference signal. The communications manager 1220 may be configured as or otherwise support a means for identifying a sequence associated with the reference signal. The communications manager 1220 may be configured as or otherwise support a means for decoding the reference signal to determine a first subset of information bits of a set of information bits encoded in the reference signal and a second subset of information bits of the set of information bits encoded in the reference signal based on identifying the sequence, the first subset of information bits encoded in the reference signal based on the sequence corresponding to a first group of sequences or a second group of sequences and the second subset of information bits encoded in the reference signal based on a mapping between the sequence and one or more values of the second subset of information bits.

By including or configuring the communications manager 1220 in accordance with examples as described herein, the device 1205 may support techniques for conveying information bits. At least one implementation may enable the communications manager 1220 to provide more efficient utilization of communication resources for the device 1205 by configuring the device 1205 to use a configured number of bits and activation of reference signals are known. At least another implementation may enable the communications manager 1220 to provide improved coordination between devices including the device 1205 by configuring the device 1205 to convey information bits via multi-mode reference signal index modulation. Based on implementing the multi-mode reference signal index modulation, the device 1205 may experience improved communication reliability and reduced latency of conveying information bits to other devices.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of multi-mode reference signal based information using index modulation as described herein, or the processor 1240 and the memory 1230 may be otherwise configured to perform or support such operations.

Figure 13:
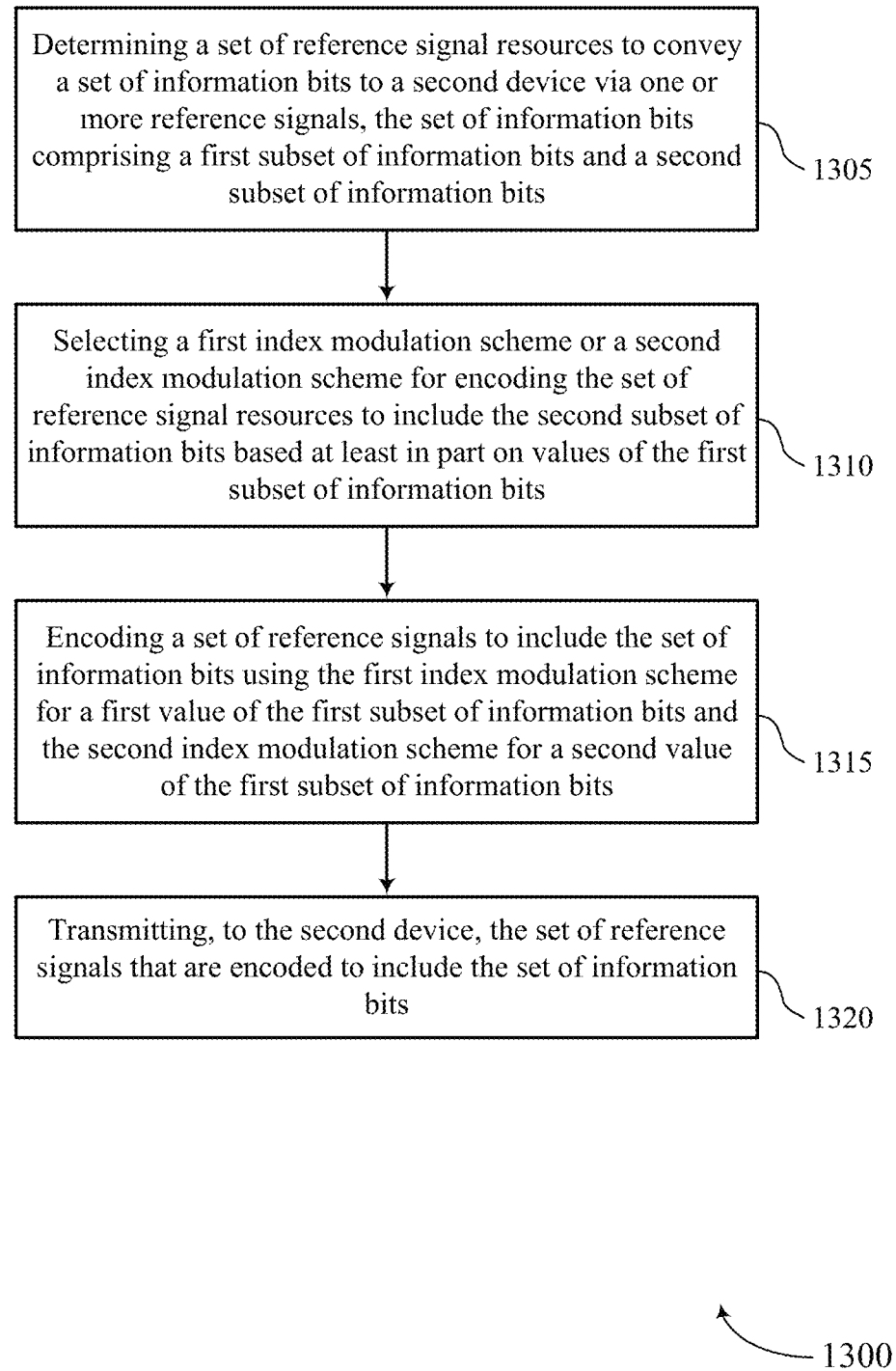
FIGS. 13 and 14 show flowcharts illustrating methods that support multi-mode reference signal based information using index modulation in accordance with aspects of the present disclosure.

FIG. 13 shows a flowchart illustrating a method 1300 that supports multi-mode reference signal based information using index modulation in accordance with aspects of the present disclosure. The operations of the method 1300 may be implemented by a UE or a base station or its components as described herein. For example, the operations of the method 1300 may be performed by a UE 115 or a base station 105 as described with reference to FIGS. 1 through 12. In some examples, a UE or a base station may execute a set of instructions to control the functional elements of the UE or the base station to perform the described functions. Additionally or alternatively, the UE or the base station may perform aspects of the described functions using special-purpose hardware.

At 1305, the method may include determining a set of reference signal resources to convey a set of information bits to a second device via one or more reference signals, the set of information bits including a first subset of information bits and a second subset of information bits. The operations of 1305 may be performed in accordance with examples as disclosed herein. In some examples, aspects of the operations of 1305 may be performed by a resource component 1025 as described with reference to FIG. 10.

At 1310, the method may include selecting a first index modulation scheme or a second index modulation scheme for encoding the set of reference signal resources to include the second subset of information bits based on values of the first subset of information bits. The operations of 1310 may be performed in accordance with examples as disclosed herein. In some examples, aspects of the operations of 1310 may be performed by a modulation component 1030 as described with reference to FIG. 10.

At 1315, the method may include encoding a set of reference signals to include the set of information bits using the first index modulation scheme for a first value of the first subset of information bits and the second index modulation scheme for a second value of the first subset of information bits. The operations of 1315 may be performed in accordance with examples as disclosed herein. In some examples, aspects of the operations of 1315 may be performed by an encoder component 1035 as described with reference to FIG. 10.

At 1320, the method may include transmitting, to the second device, the set of reference signals that are encoded to include the set of information bits. The operations of 1320 may be performed in accordance with examples as disclosed herein. In some examples, aspects of the operations of 1320 may be performed by a reference signal component 1040 as described with reference to FIG. 10.

Figure 14:
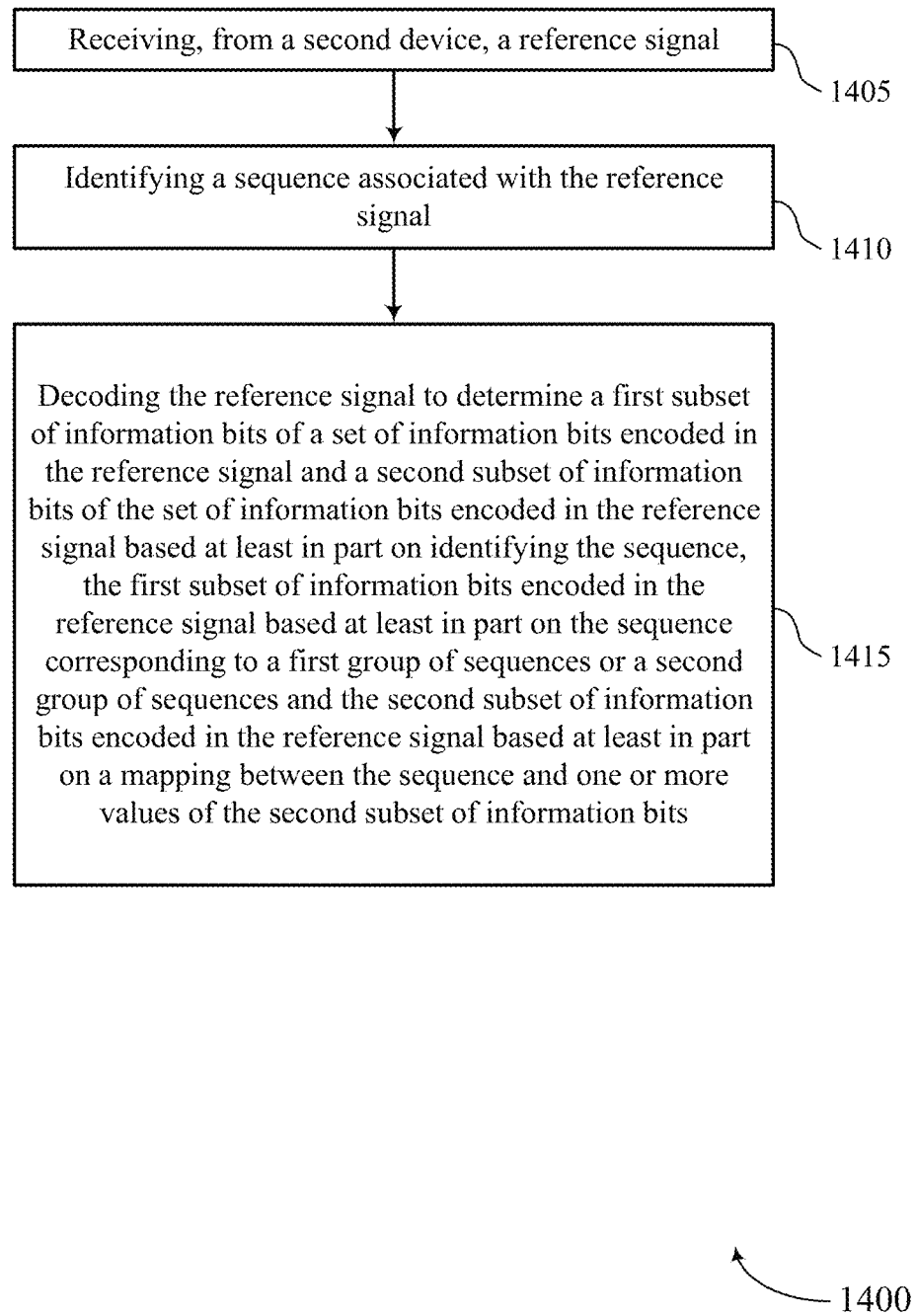

FIG. 14 shows a flowchart illustrating a method 1400 that supports multi-mode reference signal based information using index modulation in accordance with aspects of the present disclosure. The operations of the method 1400 may be implemented by a UE or a base station or its components as described herein. For example, the operations of the method 1400 may be performed by a UE 115 or a base station 105 as described with reference to FIGS. 1 through 12. In some examples, a UE or a base station may execute a set of instructions to control the functional elements of the UE or the base station to perform the described functions. Additionally or alternatively, the UE or the base station may perform aspects of the described functions using special-purpose hardware.

At 1405, the method may include receiving, from a second device, a reference signal. The operations of 1405 may be performed in accordance with examples as disclosed herein. In some examples, aspects of the operations of 1405 may be performed by a reference signal component 1040 as described with reference to FIG. 10.

At 1410, the method may include identifying a sequence associated with the reference signal. The operations of 1410 may be performed in accordance with examples as disclosed herein. In some examples, aspects of the operations of 1410 may be performed by a sequence component 1045 as described with reference to FIG. 10.

At 1415, the method may include decoding the reference signal to determine a first subset of information bits of a set of information bits encoded in the reference signal and a second subset of information bits of the set of information bits encoded in the reference signal based on identifying the sequence, the first subset of information bits encoded in the reference signal based on the sequence corresponding to a first group of sequences or a second group of sequences and the second subset of information bits encoded in the reference signal based on a mapping between the sequence and one or more values of the second subset of information bits. The operations of 1415 may be performed in accordance with examples as disclosed herein. In some examples, aspects of the operations of 1415 may be performed by a decoder component 1050 as described with reference to FIG. 10.

The following provides an overview of aspects of the present disclosure:

Aspect 1: A method for wireless communication at a first device, comprising: determining a set of reference signal resources to convey a set of information bits to a second device via one or more reference signals, the set of information bits comprising a first subset of information bits and a second subset of information bits; selecting a first index modulation scheme or a second index modulation scheme for encoding the set of reference signal resources to include the second subset of information bits based at least in part on values of the first subset of information bits; encoding a set of reference signals to include the set of information bits using the first index modulation scheme for a first value of the first subset of information bits and the second index modulation scheme for a second value of the first subset of information bits; and transmitting, to the second device, the set of reference signals that are encoded to include the set of information bits.

Aspect 2: The method of aspect 1, wherein encoding the set of reference signals comprises: encoding the set of reference signals to include the first subset of information bits using a spatial index modulation scheme comprising mapping the first subset of information bits to one or more directional beams, wherein transmitting the set of reference signals is based at least in part on the spatial index modulation scheme.

Aspect 3: The method of any of aspects 1 through 2, wherein encoding the set of reference signals comprises: encoding the set of reference signals to include the first subset of information bits based at least in part on a frequency domain index modulation scheme comprising mapping the first subset of information bits to one or more subcarriers in a frequency domain, wherein transmitting the set of reference signals is based at least in part on the frequency domain index modulation scheme.

Aspect 4: The method of any of aspects 1 through 3, wherein encoding the set of reference signals comprises: encoding the set of reference signals to include the first subset of information bits based at least in part on a time domain index modulation scheme comprising mapping the first subset of information bits to one or more symbol periods in a time domain, wherein transmitting the encoded set of reference signals is based at least in part on the time domain index modulation scheme.

Aspect 5: The method of any of aspects 1 through 4, wherein encoding the set of reference signals comprises: encoding the set of reference signals to include the second subset of information bits based at least in part on mapping the second subset of information bits to one or more reference signal sequences, wherein transmitting the encoded set of reference signals is based at least in part on the one or more reference signal sequences.

Aspect 6: The method of any of aspects 1 through 5, wherein the first index modulation scheme comprises a first subset of reference signal sequences that map to values of the second subset of information bits; and the second index modulation scheme comprises a second subset of reference signal sequences that map to the values of the second subset of information bits.

Aspect 7: The method of any of aspects 1 through 6, wherein encoding the set of reference signals comprises: encoding the set of reference signals to include the second subset of information bits based at least in part on mapping the second subset of information bits to one or more reference signal ports, wherein transmitting the encoded set of reference signals is based at least in part on the one or more reference signal ports.

Aspect 8: The method of any of aspects 1 through 7, wherein encoding the set of reference signals comprises: encoding the set of reference signals to include the second subset of information bits based at least in part on a reference signal density in one or both of a time domain and a frequency domain, wherein transmitting the encoded set of reference signals is based at least in part on the reference signal density.

Aspect 9: The method of any of aspects 1 through 8, wherein encoding the set of reference signals comprises: encoding the set of reference signals to include the second subset of information bits based at least in part on an allocation of reference signal resources in one or more both of a time domain and a frequency domain in a reference signal resource block, wherein transmitting the encoded set of reference signals is based at least in part on the allocation of reference signal resources in one or more both of the time domain and the frequency domain in the reference signal resource block.

Aspect 10: The method of any of aspects 1 through 9, wherein encoding the set of reference signals comprises: encoding the set of reference signals to include the second subset of information bits based at least in part on an allocation of reference signal resources in one or more both of a time domain and a frequency domain in bandwidth part, wherein transmitting the encoded set of reference signals is based at least in part on the allocation of reference signal resources in one or more both of the time domain and the frequency domain in the bandwidth part.

Aspect 11: The method of any of aspects 1 through 10, wherein one or more reference signal resources of the set of reference signal resources are orthogonal in a time domain.

Aspect 12: The method of any of aspects 1 through 11, wherein one or more reference signal resources of the set of reference signal resources are orthogonal in a frequency domain.

Aspect 13: The method of any of aspects 1 through 12, wherein one or more reference signal resources of the set of reference signal resources are orthogonal in a spatial domain.

Aspect 14: The method of any of aspects 1 through 13, wherein the first device comprises a UE; the second device comprises a base station; and a reference signal of the set of reference signals comprises a SRS, a PRACH, or a DMRS, or any combination thereof.

Aspect 15: The method of any of aspects 1 through 14, wherein the first device comprises a base station; the second device comprises a UE; and a reference signal of the set of reference signals comprises a CSI-RS or a DMRS, or a combination thereof.

Aspect 16: The method of any of aspects 1 through 15, wherein the first device comprises a first UE; the second device comprises a second UE; and a reference signal of the set of reference signals comprises a SL-RS.

Aspect 17: A method for wireless communication at a first device, comprising: receiving, from a second device, a reference signal; identifying a sequence associated with the reference signal; and decoding the reference signal to determine a first subset of information bits of a set of information bits encoded in the reference signal and a second subset of information bits of the set of information bits encoded in the reference signal based at least in part on identifying the sequence, the first subset of information bits encoded in the reference signal based at least in part on the sequence corresponding to a first group of sequences or a second group of sequences and the second subset of information bits encoded in the reference signal based at least in part on a mapping between the sequence and one or more values of the second subset of information bits.

Aspect 18: The method of aspect 17, wherein decoding the reference signal comprises: decoding the reference signal to determine the first subset of information bits based at least in part on a spatial index demodulation comprising mapping the first subset of information bits to one or more directional beams.

Aspect 19: The method of any of aspects 17 through 18, wherein decoding the reference signal comprises: decoding the reference signal to determine the first subset of information bits based at least in part on a frequency domain index demodulation comprising mapping the first subset of information bits to one or more symbol periods in a frequency domain.

Aspect 20: The method of any of aspects 17 through 19, wherein decoding the reference signal comprises: decoding the reference signal to determine the first subset of information bits based at least in part on a time domain index demodulation comprising mapping the first subset of information bits to one or more symbol periods in a time domain.

Aspect 21: The method of any of aspects 17 through 20, wherein decoding the reference signal comprises: decoding the reference signal to determine the second subset of information bits based at least in part on mapping the second subset of information bits to one or more reference signal sequences.

Aspect 22: The method of any of aspects 17 through 21, wherein decoding the reference signal comprises: decoding the reference signal to determine the second subset of information bits based at least in part on mapping the second subset of information bits to one or more reference signal ports.

Aspect 23: The method of any of aspects 17 through 22, wherein decoding the reference signal comprises: decoding the reference signal to determine the second subset of information bits based at least in part on a reference signal density in one or both of a time domain and a frequency domain.

Aspect 24: The method of any of aspects 17 through 23, wherein decoding the reference signal comprises: decoding the reference signal to determine the second subset of information bits based at least in part on an allocation of reference signal resources in one or more both of a time domain and a frequency domain in a reference signal resource block.

Aspect 25: The method of any of aspects 17 through 24, wherein decoding the reference signal comprises: decoding the reference signal to determine the second subset of information bits based at least in part on an allocation of reference signal resources in one or more both of a time domain and a frequency domain in bandwidth part.

Aspect 26: The method of any of aspects 17 through 25, wherein the first device comprises a base station; the second device comprises a UE; and the reference signal comprises a SRS, a PRACH, or a DMRS, or any combination thereof.

Aspect 27: The method of any of aspects 17 through 26, wherein the first device comprises a UE; and the second device comprises a base station; the reference signal comprises a CSI-RS or a DMRS, or a combination thereof.

Aspect 28: The method of any of aspects 17 through 27, wherein the first device comprises a second UE; and the second device comprises a first UE; the reference signal comprises a SL-RS.

Aspect 29: An apparatus for wireless communication at a first device, comprising a processor; memory coupled with the processor; and instructions stored in the memory and executable by the processor to cause the apparatus to perform a method of any of aspects 1 through 16.

Aspect 30: An apparatus for wireless communication at a first device, comprising at least one means for performing a method of any of aspects 1 through 16.

Aspect 31: A non-transitory computer-readable medium storing code for wireless communication at a first device, the code comprising instructions executable by a processor to perform a method of any of aspects 1 through 16.

Aspect 32: An apparatus for wireless communication at a first device, comprising a processor; memory coupled with the processor; and instructions stored in the memory and executable by the processor to cause the apparatus to perform a method of any of aspects 17 through 28.

Aspect 33: An apparatus for wireless communication at a first device, comprising at least one means for performing a method of any of aspects 17 through 28.

Aspect 34: A non-transitory computer-readable medium storing code for wireless communication at a first device, the code comprising instructions executable by a processor to perform a method of any of aspects 17 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first device for wireless communications, comprising:
a memory; and
at least one processor coupled to the memory, wherein the first device is configured to:
select a first index modulation scheme or a second index modulation scheme to encode a set of reference signal resources to include a second subset of information bits based on values associated with a first subset of information bits, wherein the first index modulation scheme and the second index modulation scheme are different types of multi-mode reference signal index modulation schemes, and wherein the set of reference signal resources convey a set of information bits to a second device via one or more reference signals, and wherein the set of information bits comprises the first subset of information bits and the second subset of information bits;
encode the set of information bits by application of, to a set of reference signals to be transmitted using the set of reference signal resources, the first index modulation scheme for a first value of the first subset of information bits and the second index modulation scheme for a second value of the first subset of information bits, wherein a respective bit value associated with the second subset of information bits is encoded based on a respective bit value associated with the first subset of information bits; and
transmit, to the second device, the encoded set of information bits via the set of reference signals.

2. The first device of claim 1, wherein, to encode the set of information bits, the first device is configured to:
encode the set of information bits to the set of reference signals to include the first subset of information bits using, as a type of multi-mode reference signal index modulation scheme, a spatial index modulation scheme and map the first subset of information bits to one or more directional beams, wherein the set of reference signals are transmitted based on the spatial index modulation scheme.

3. The first device of claim 1, wherein, to encode the set of information bits, the first device is configured to:
encode the set of information bits to the set of reference signals to include the first subset of information bits using, as a type of multi-mode reference signal index modulation scheme, a frequency domain index modulation scheme and map the first subset of information bits to one or more subcarriers in a frequency domain, wherein the set of reference signals are transmitted based on the frequency domain index modulation scheme.

4. The first device of claim 1, wherein, to encode the set of information bits, the first device is configured to:
encode the set of information bits to the set of reference signals to include the first subset of information bits using, as a type of multi-mode reference signal index modulation scheme, a time domain index modulation scheme and map the first subset of information bits to one or more symbol periods in a time domain, wherein the set of reference signals are transmitted based on the time domain index modulation scheme.

5. The first device of claim 1 wherein, to encode the set of information bits, the first device is configured to:
encode the set of information bits to the set of reference signals to include the second subset of information bits based on mapping the second subset of information bits to one or more reference signal sequences, wherein the set of reference signals are transmitted based on the one or more reference signal sequences.

6. The first device of claim 1, wherein:
the first index modulation scheme comprises a first subset of reference signal sequences that map to values of the second subset of information bits; and
the second index modulation scheme comprises a second subset of reference signal sequences that map to the values of the second subset of information bits.

7. The first device of claim 1, wherein, to encode the set of information bits, the first device is configured to:
encode the set of information bits to the set of reference signals to include the second subset of information bits based on mapping the second subset of information bits to one or more reference signal ports, wherein the set of reference signals are transmitted based on the one or more reference signal ports.

8. The first device of claim 1, wherein, to encode the set of information bits, the first device is configured to:
encode the set of information bits to the set of reference signals to include the second subset of information bits based on a reference signal density in one or both of a time domain and a frequency domain, wherein the set of reference signals are transmitted based on the reference signal density.

9. The first device of claim 1 wherein, to encode the set of information bits, the first device is configured to:
encode the set of information bits to the set of reference signals to include the second subset of information bits based on an allocation of reference signal resources in a time domain or a frequency domain in a reference signal resource block, wherein the set of reference signals are transmitted based on the allocation of reference signal resources in the time domain or the frequency domain in the reference signal resource block.

10. The first device of claim 1, wherein, to encode the set of information bits, the first device is configured to:
encode the set of information bits to the set of reference signals to include the second subset of information bits based on an allocation of reference signal resources in a time domain or a frequency domain in a bandwidth part, wherein the set of reference signals are transmitted based on the allocation of reference signal resources in the time domain or the frequency domain in the bandwidth part.

11. The first device of claim 1, wherein one or more reference signal resources of the set of reference signal resources are orthogonal in a time domain.

12. The first device of claim 1, wherein one or more reference signal resources of the set of reference signal resources are orthogonal in a frequency domain.

13. The first device of claim 1, wherein one or more reference signal resources of the set of reference signal resources are orthogonal in a spatial domain.

14. The first device of claim 1, wherein:
the first device comprises a user equipment;
the second device comprises a network device; and
a reference signal of the set of reference signals comprises a sounding reference signal, a physical random access channel, or a demodulation reference signal, or any combination thereof.

15. The first device of claim 1, wherein:
the first device comprises a network device;
the second device comprises a user equipment; and
a reference signal of the set of reference signals comprises a channel state information reference signal or a demodulation reference signal, or a combination thereof.

16. The first device of claim 1, wherein:
the first device comprises a first user equipment;
the second device comprises a second user equipment; and
a reference signal of the set of reference signals comprises a sidelink reference signal.

17. A first device for wireless communication, comprising:
a memory; and
at least one processor coupled to the memory, wherein the first device is configured to:
receive, from a second device, a reference signal that includes a sequence; and
decode, from the reference signal, a first subset of information bits of a set of information bits encoded in the reference signal and a second subset of information bits of the set of information bits encoded in the reference signal based on the sequence and on values associated with the first subset of information bits, the first subset of information bits encoded in the reference signal based on the sequence corresponding to a first group of sequences or a second group of sequences and the second subset of information bits encoded in the reference signal based on a mapping between the sequence and one or more values of the second subset of information bits, wherein a respective bit value associated with the second subset of information bits is decoded based on a respective bit value associated with the first subset of information bits.

18. The first device of claim 17, wherein, to decode the first subset of information bits and the second subset of information bits, the first device is configured to:
decode the first subset of information bits based on a spatial index demodulation that maps the first subset of information bits to one or more directional beams.

19. The first device of claim 17, wherein, to decode the first subset of information bits and the second subset of information bits, the first device is configured to:
decode the first subset of information bits based on a frequency domain index demodulation that maps the first subset of information bits to one or more symbol periods in a frequency domain.

20. The first device of claim 17, wherein, to decode the first subset of information bits and the second subset of information bits, the first device is configured to:
decode the first subset of information bits based on a time domain index demodulation that maps the first subset of information bits to one or more symbol periods in a time domain.

21. The first device of claim 17, wherein, to decode the first subset of information bits and the second subset of information bits, the first device is configured to:
decode the second subset of information bits based on a mapping of the second subset of information bits to one or more reference signal sequences.

22. The first device of claim 17, wherein, to decode the first subset of information bits and the second subset of information bits, the first device is configured to:
    decode the second subset of information bits based on a mapping of the second subset of information bits to one or more reference signal ports.

23. The first device of claim 17, wherein, to decode the first subset of information bits and the second subset of information bits, the first device is configured to:
    decode the second subset of information bits based on a reference signal density in a time domain or a frequency domain.

24. The first device of claim 17 wherein, to decode the first subset of information bits and the second subset of information bits, the first device is configured to:
    decode the second subset of information bits based on an allocation of reference signal resources in a time domain or a frequency domain in a reference signal resource block.

25. The first device of claim 17, wherein, to decode the first subset of information bits and the second subset of information bits, the first device is configured to:
    decode the second subset of information bits based on an allocation of reference signal resources in a time domain or a frequency domain in a bandwidth part.

26. The first device of claim 17, wherein:
    the first device comprises a network device;
    the second device comprises a user equipment; and
    the reference signal comprises a sounding reference signal, a physical random access channel, or a demodulation reference signal, or any combination thereof.

27. The first device of claim 17, wherein:
    the first device comprises a user equipment;
    the second device comprises a network device; and
    the reference signal comprises a channel state information reference signal or a demodulation reference signal, or a combination thereof.

28. The first device of claim 17, wherein:
    the first device comprises a second user equipment;
    the second device comprises a first user equipment; and
    the reference signal comprises a sidelink reference signal.

29. A method for wireless communication at a first device, comprising:
    selecting a first index modulation scheme or a second index modulation scheme for encoding a set of reference signal resources to include a second subset of information bits based on values associated with a first subset of information bits wherein the first index modulation scheme and the second index modulation scheme are different types of multi-mode reference signal index modulation schemes, and wherein the set of reference signal resources convey a set of information bits to a second device via one or more reference signals, and wherein the set of information bits comprises the first subset of information bits and the second subset of information bits;

encoding the set of information bits by applying, to a set of reference signals to be transmitted using the set of reference signal resources, the first index modulation scheme for a first value of the first subset of information bits and the second index modulation scheme for a second value of the first subset of information bits, wherein a respective bit value associated with the second subset of information bits is encoded based on a respective bit value associated with the first subset of information bits; and transmitting, to the second device, the encoded set of information bits.

30. A method for wireless communication at a first device, comprising:
    receiving, from a second device, a reference signal that includes a sequence; and
    decoding, from the reference signal, a first subset of information bits of a set of information bits encoded in the reference signal and a second subset of information bits of the set of information bits encoded in the reference signal based on the sequence and on values associated with the first subset of information bits, the first subset of information bits encoded in the reference signal based on the sequence corresponding to a first group of sequences or a second group of sequences and the second subset of information bits encoded in the reference signal based on a mapping between the sequence and one or more values of the second subset of information bits, wherein a respective bit value associated with the second subset of information bits is decoded based on a respective bit value associated with the first subset of information bits.

* * * * *